United States Patent
Makino et al.

(10) Patent No.: US 9,837,894 B2
(45) Date of Patent: Dec. 5, 2017

(54) CHOPPER DEVICE

(71) Applicant: Fuji Electric Co., Ltd., Kanagawa (JP)

(72) Inventors: Ryohei Makino, Tokyo (JP); Motoyoshi Kubouchi, Nagano (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 15/403,551

(22) Filed: Jan. 11, 2017

(65) Prior Publication Data

US 2017/0244319 A1    Aug. 24, 2017

(30) Foreign Application Priority Data

Feb. 22, 2016  (JP) ................................. 2016-030742

(51) Int. Cl.
| | |
|---|---|
| *H02M 3/135* | (2006.01) |
| *H02P 27/06* | (2006.01) |
| *H02M 1/32* | (2007.01) |
| *H02M 7/483* | (2007.01) |

(52) U.S. Cl.
CPC ............ *H02M 3/135* (2013.01); *H02P 27/06* (2013.01); *H02M 1/32* (2013.01); *H02M 7/483* (2013.01)

(58) Field of Classification Search
CPC ... H02M 2001/0003; H02M 2001/322; H02M 2001/327; H02M 2007/4835; H02M 7/483; H02M 7/42; H02M 7/487; H02M 1/32; H02M 1/36; H02M 3/156; H02M 3/155; H02M 3/158; H02M 3/1584; H02M 3/1588
See application file for complete search history.

(56) References Cited

U.S. PATENT DOCUMENTS

| | | | |
|---|---|---|---|
| 6,987,680 B2 * | 1/2006 | Vire | H02M 3/07 363/124 |
| 7,965,069 B2 | 6/2011 | Watanabe et al. | |
| 2011/0019449 A1 * | 1/2011 | Katoh | H02M 1/088 363/124 |
| 2014/0029308 A1 * | 1/2014 | Cojocaru | H01G 4/38 363/13 |

(Continued)

FOREIGN PATENT DOCUMENTS

| | | | |
|---|---|---|---|
| JP | 11275872 A | * | 10/1999 |
| JP | 2008-236863 A | | 10/2008 |

*Primary Examiner* — Emily P Pham
*Assistant Examiner* — Shahzeb K Ahmad
(74) *Attorney, Agent, or Firm* — Chen Yoshimura LLP

(57) ABSTRACT

A chopper device includes: a series circuit connecting at one end to a positive pole of a DC power source and having a breaker and a reactor; a series circuit connected between another end of the stated series circuit and a negative pole of the DC power source and having switches; a series circuit connected in parallel to the switch and having a diode and a capacitor; and a series circuit connected in parallel to the switch and having a diode and a capacitor. The chopper device outputs a DC voltage at three potentials from both ends and a midpoint of a series circuit having the capacitors by turning the switches ON/OFF. The chopper device further includes other switches connected in parallel to the switches. When a short-circuit fault is presumed to have occurred in the switch, the other switch is turned ON before interruption is performed by the breaker.

20 Claims, 33 Drawing Sheets

(56) References Cited

U.S. PATENT DOCUMENTS

| | | | |
|---|---|---|---|
| 2015/0146459 A1* | 5/2015 | Du | H02H 3/20 |
| | | | 363/53 |
| 2015/0340859 A1* | 11/2015 | Barker | H02H 3/07 |
| | | | 361/62 |
| 2016/0064160 A1* | 3/2016 | Lemmen | H02M 3/158 |
| | | | 363/123 |
| 2016/0072267 A1* | 3/2016 | Fu | H02G 7/16 |
| | | | 219/488 |
| 2016/0268900 A1* | 9/2016 | Miyazaki | H02M 1/088 |

* cited by examiner

CHOPPER DEVICE

BACKGROUND OF THE INVENTION

Technical Field

This invention relates to a chopper device, used in a field such as railways, that transforms an input DC voltage into a DC voltage of a predetermined magnitude and outputs the resulting DC voltage.

Background Art

FIG. 31 is a circuit diagram illustrating an example of a conventional three-level chopper device.

In FIG. 31, a breaker 2 constituted by a current interrupting device having a mechanical contact, a fuse, or the like, a reactor 3, and semiconductor switching elements (also simply called "switches" hereinafter) 4 and 5 are connected in series between a positive pole and a negative pole of a DC power source 1. Here, insulated gate bipolar transistors (IGBTs), MOS field effect transistors (MOSFETs), bipolar power transistors, or the like are used for the switches 4 and 5.

A diode 6 and a capacitor 8 are connected in series to respective ends of the switch 4, and a diode 7 and a capacitor 9 are connected in series to respective ends of the switch 5.

Both ends of a series circuit constituted by the capacitors 8 and 9 and a connection point (midpoint) between the capacitors 8 and 9 serve as output terminals of the chopper device. A load 101, including a half-bridge inverter constituted by switches 10 and 11 such as IGBTs and an AC motor 12, is connected between the output terminals.

According to this chopper device, energy stored in the reactor 3 is supplied to the series circuit constituted by the capacitors 8 and 9 by the switches 4 and 5 turning on and off, and a DC voltage at three potentials is outputted to the load 101 from the series circuit. Here, the voltages of the capacitors 8 and 9 are controlled to higher values than the voltage of the DC power source 1, and thus the circuit illustrated in FIG. 31 functions as a three-level boosting chopper device.

Note that the load 101 operates so as to transform the DC voltage into an AC voltage by the switches 10 and 11 of the half-bridge inverter turning on and off and supply the AC voltage to the motor 12.

When a fault occurs in such a chopper device, protective measures are typically taken by turning the switches 10 and 11 of the inverter off and separating the load 101 from the chopper device, and furthermore turning the switches 4 and 5 that implement chopper operations off so that current does not flow in the load 101.

However, when a short-circuit fault where, for example, the one switch 4 in the chopper device is fully conductive occurs, the equivalent circuit illustrated in FIG. 32 is formed. Normal measures in this case are turning the switches 10 and 11 off, separating the load 101, and turning the other switch 5 in the chopper device off.

FIG. 33 illustrates an equivalent circuit in the case where the load 101 has been separated and the switch 5 has been turned off in response to a short-circuit fault in the switch 4.

In this circuit, series resonance current produced by the reactor 3 and the capacitor 9 flows from the DC power source 1 via the short-circuited switch 4, along a path a indicated by the broken line. Because the switch 4 is short-circuited, the series resonance current cannot be controlled. There is thus a risk that the capacitor 9 will be charged to a higher voltage than the voltage of the DC power source 1 (that is, to a voltage greater than the breakdown voltage of the capacitor 9). Particularly, with this type of chopper device, although there are cases where the device operates with the voltage of the capacitor 9 at a lower value than the voltage of the DC power source 1 during normal operations, the voltage of the capacitor 9 may rise to approximately three times the voltage occurring in normal operations when series resonance current flows along the path a indicated in FIG. 33.

Meanwhile, in the case where the chopper device is installed in a rail car, the voltage of the DC power source 1 supplied from a contact wire fluctuates frequently due to pantograph bounce, regenerative driving of other cars, and so on. Particularly, if a DC source voltage fluctuates drastically, there is a risk that the capacitor 9 will reach an even higher voltage due to the series resonance current in the path a. Assuming an electrostatic capacitance of the capacitor is represented by C and the voltage by V, generally, when a voltage that greatly exceeds the breakdown voltage is instantaneously applied to the capacitor, energy equivalent to $CV^2/2$ is released all at once, which causes the capacitor to explode.

Opening the breaker 2 can be thought of as a method for interrupting the series resonance current in the path a illustrated in FIG. 33. However, in the case where the breaker 2 is constituted by a fuse, for example, the fuse can only be melted by a large current and it takes a certain amount of time for the fuse to be completely melted. There is thus a risk that the voltage in the capacitor 9 will rise before the fuse melts. It is thus desirable that the series resonance current be interrupted by the breaker 2 before the voltage of the capacitor 9 rises. However, in the case where the inductance of the reactor 3 is high, a large surge voltage may arise if current flowing in the reactor 3 is forcefully interrupted by the breaker 2, which may damage the switches and the like. The melting time for the fuse must therefore be somewhat long.

Even if the breaker 2 is constituted by a current interrupting device having a mechanical contact, there is a time delay in the operation of the contact, and thus the operation may be too late for the rise in the voltage of the capacitor 9.

Thus as described above, it is difficult to completely prevent the capacitor 9 from being damaged by overvoltage by interrupting the series resonance current using the breaker 2.

Note that Patent Document 1 discloses related art in which, in a chopper device having substantially the same configuration as that illustrated in FIG. 31, a short-circuit fault or the like is detected in the capacitor on the basis of a potential at a midpoint in the capacitor series circuit, and operations of the switches in the chopper device are then limited.

RELATED ART DOCUMENT

Patent Document

Patent Document 1: Japanese Patent Application Laid-Open Publication No. 2008-236863 (paragraphs [0079] to [0081], FIG. 1, and so on)

SUMMARY OF THE INVENTION

As described above, in the case where a short-circuit fault has occurred in a switch in a chopper device, there has thus far not been a useful technique for protecting a capacitor on the output side from being damaged by overvoltage. Such a technique is therefore needed.

As such, a problem to be solved by the present invention is to provide a chopper device capable of reliably preventing an output-side capacitor from being damaged by overvoltage even in the case where a fault has occurred in a switch, and furthermore capable of ensuring minimal necessary replacement of faulted semiconductor elements as economically as possible. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in a first aspect, the present disclosure provides a chopper device, including:

a DC power source;

a series circuit having a breaker and a reactor connected in series, one end of the series circuit being connected to one pole of the DC power source;

a switch series circuit having a first switch and a second switch connected in series, the switch series circuit being connected between another end of the series circuit and another pole of the DC power source;

a first series circuit having a first diode and a first capacitor connected in series, the first series circuit being connected in parallel to the first switch; and a second series circuit having a second diode and a second capacitor connected in series, the second series circuit being connected in parallel to the second switch, wherein the first capacitor and the second capacitor are connected in series, defining a capacitor series circuit, wherein the first switch and the second switch are turned ON and OFF to output DC voltages at three potentials from both ends and a midpoint of the capacitor series circuit having the first capacitor and the second capacitor, thereby supplying the DC voltages to a load, wherein the chopper device further includes a third switch connected in parallel to the first switch and a fourth switch connected in parallel to the second switch, and wherein when a short-circuit fault is detected to have occurred in the first switch, the fourth switch is turned ON before interruption is performed by the breaker, and when a short-circuit fault is detected to have occurred in the second switch, the third switch is turned ON before interruption is performed by the breaker.

In a second aspect, the present disclosure provides a chopper device, including:

a DC power source;

a series circuit having a breaker and a reactor connected in series, one end of the series circuit being connected to one pole of the DC power source;

a switch series circuit having a first switch and a second switch connected in series, the switch series circuit being connected between another end of the series circuit and another pole of the DC power source;

a first series circuit having a first diode and a first capacitor connected in series, the first series circuit being connected in parallel to the first switch; and a second series circuit having a second diode and a second capacitor connected in series, the second series circuit being connected in parallel to the second switch, wherein the first capacitor and the second capacitor are connected in series, defining a capacitor series circuit, wherein the first switch and the second switch are turned ON and OFF to output DC voltages at three potentials from both ends and a midpoint of the capacitor series circuit having the first capacitor and the second capacitor, thereby supplying the DC voltages to a load, wherein the chopper device further includes a third switch connected in parallel to the first capacitor and a fourth switch connected in parallel to the second capacitor, and wherein when a short-circuit fault is detected to have occurred in the first switch, the fourth switch is turned ON before interruption is performed by the breaker, and when a short-circuit fault is detected to have occurred in the second switch, the third switch is turned ON before interruption is performed by the breaker.

In a third aspect, the present disclosure provides a chopper device, including:

a DC power source;

a series circuit having a breaker and a reactor connected in series, one end of the series circuit being connected to one pole of the DC power source;

a switch series circuit having a first switch and a second switch connected in series, the switch series circuit being connected between another end of the series circuit and another pole of the DC power source;

a first series circuit having a first diode and a first capacitor connected in series, the first series circuit being connected in parallel to the first switch; and a second series circuit having a second diode and a second capacitor connected in series, the second series circuit being connected in parallel to the second switch, wherein the first capacitor and the second capacitor are connected in series, defining a capacitor series circuit, wherein the first switch and the second switch are turned ON and OFF to output DC voltages at three potentials from both ends and a midpoint of the capacitor series circuit having the first capacitor and the second capacitor, thereby supplying the DC voltages to a load, wherein the chopper device further includes a third switch connected in parallel to the switch series circuit, wherein when a short-circuit fault is detected to have occurred in the first switch or the second switch, the third switch is turned ON before interruption is performed by the breaker.

In a fourth aspect, the present disclosure provides a chopper device, including:

a DC power source;

a first series circuit having a breaker and a reactor connected in series, one end of the first series circuit being connected to one pole of the DC power source;

a first switch connected between another end of the first series circuit and another pole of the DC power source; and a second series circuit having a diode and a capacitor connected in series, the second series circuit being connected in parallel to the first switch, the first switch being turned ON and OFF to output a DC voltage at a prescribed magnitude from both ends of the capacitor, wherein the chopper device further includes a second switch connected in parallel to the first switch, and wherein when a state of overvoltage is detected to have occurred in the capacitor, the second switch is turned ON before interruption is performed by the breaker.

In a fifth aspect, the present disclosure provides a chopper device, including:

a DC power source;

a first series circuit having a breaker and a reactor connected in series, one end of the first series circuit being connected to one pole of the DC power source;

a first switch connected between another end of the first series circuit and another pole of the DC power source; and a second series circuit having a diode and a capacitor connected in series, the second series circuit being connected in parallel to the first switch, the first switch being turned ON and OFF to output a DC voltage at a prescribed magnitude from both ends of the capacitor, wherein the chopper device further includes a second switch connected in parallel to the capacitor, and wherein when a state of overvoltage is detected to have occurred in the capacitor, the second switch is turned ON before interruption is performed by the breaker.

Note that in the sixth to twelfth aspects of the present invention, the third switch and the fourth switch, or the third switch alone, may be housed in a different package from a package in which the first switch or the second switch is housed.

Additionally, the first diode and the first switch may be housed in the same package, and the second diode and the second switch may be housed together in a different package.

Alternatively, the third switch and the fourth switch may be housed in the same package, or may be housed in mutually different packages.

Furthermore, the first diode and the third switch may be housed in the same package, and the second diode and the fourth switch may be housed together in a different package.

Additionally, in the thirteenth to fifteenth aspects of the present invention, it is desirable that elements constituted by wide band-gap semiconductors be used as switches that perform chopper operations, and that elements constituted by silicon semiconductors be used as switches for protection.

Furthermore, it is desirable that elements constituted by wide band-gap semiconductors be used as the diodes.

According to the first to fifth aspects of the present invention, in the case where a short-circuit fault is presumed to occur in a switch that performs chopper operations, or in the case where there is an indication that an output-side capacitor will enter a state of overvoltage, the capacitor can be prevented from being damaged by the overvoltage by turning a switch for protection on and eliminating a current path that passes through the capacitor.

Additionally, packaging the diodes and switches in various states as described in the sixth to twelfth aspects of the present invention makes it possible to replace the minimum number of those semiconductor elements on a package-by-package basis in the case where those semiconductor elements have faulted and thus need to be replaced.

In particular, using elements constituted by comparatively high-cost wide band-gap semiconductors and elements constituted by comparatively low-cost silicon semiconductors as the diodes and switches depending on the situation, as described in the thirteenth to fifteenth aspects of the present invention, makes it possible to eliminate wasteful replacement of high-cost semiconductor elements and improve the cost performance of the device.

It is to be understood that both the foregoing general description and the following detailed description are exemplary and explanatory, and are intended to provide further explanation of the invention as claimed.

DETAILED DESCRIPTION OF EMBODIMENTS

Figure 31:
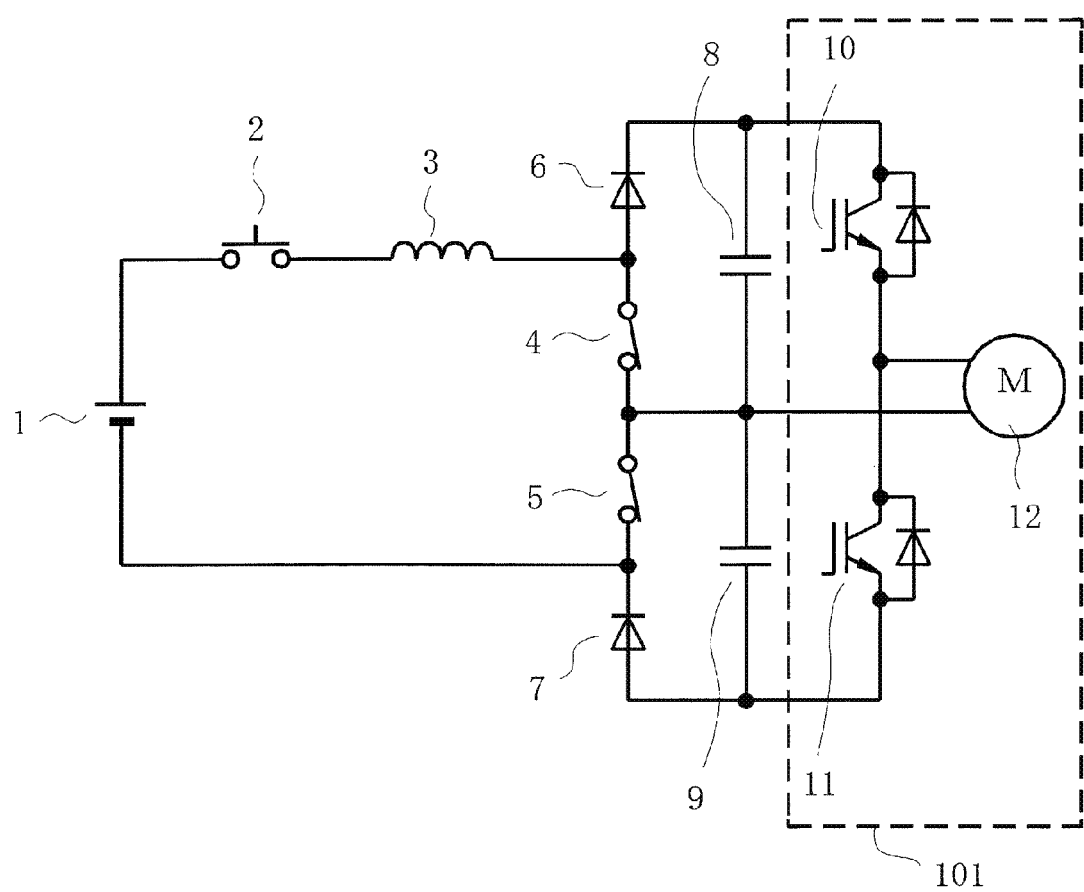
FIG. 31 is a circuit diagram illustrating an example of a conventional three-level chopper device.
Figure 32:
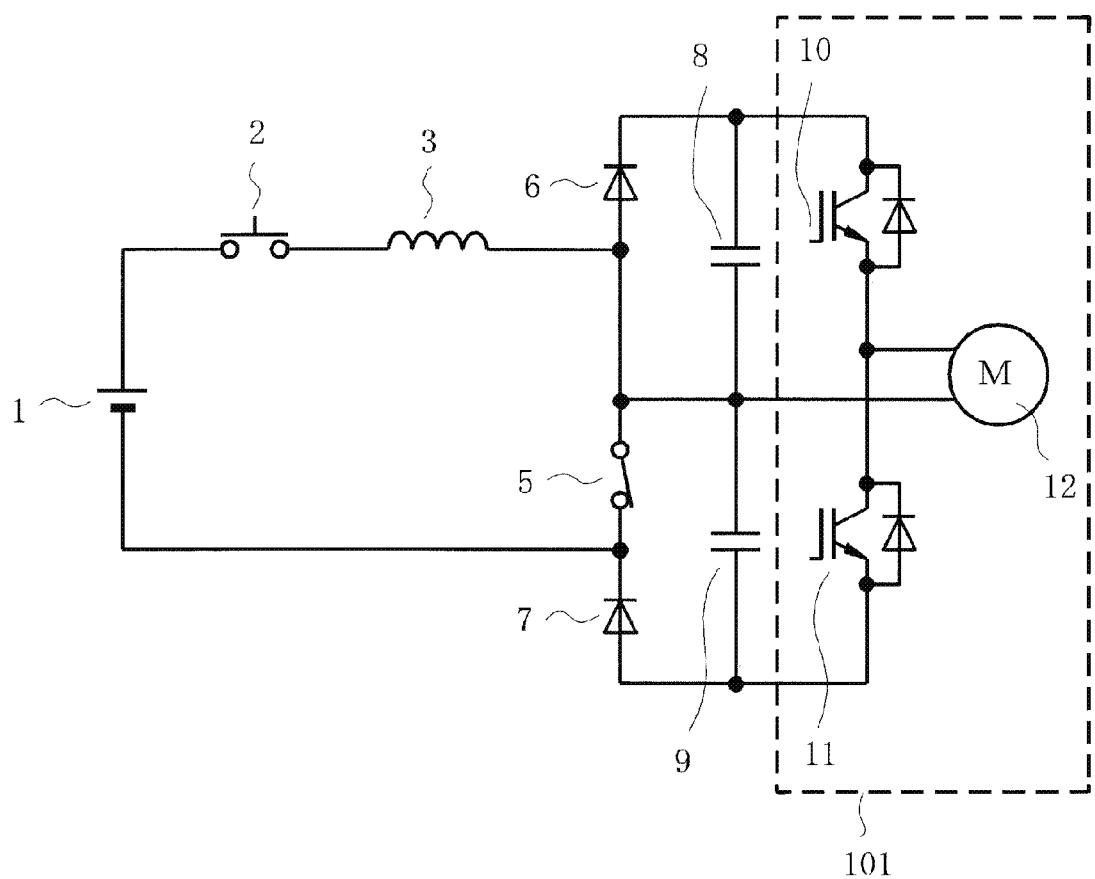
FIG. 32 is an equivalent circuit diagram of the chopper device illustrated in FIG. 31 in a case where one switch has short-circuited.
Figure 33:
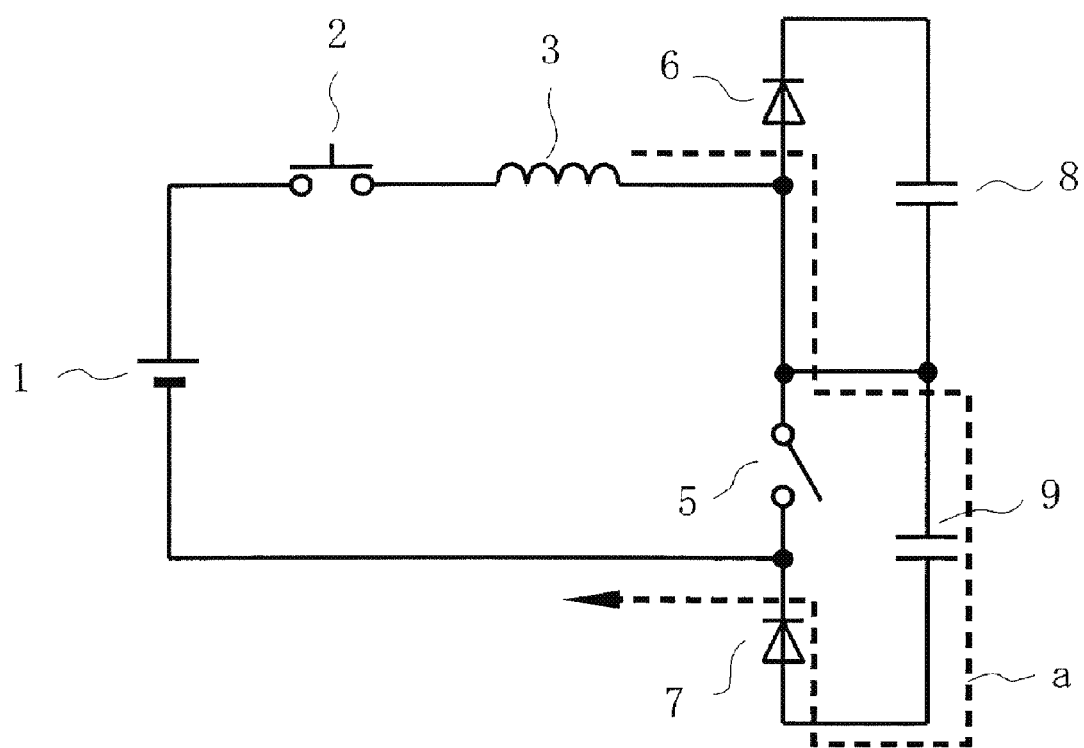
FIG. 33 is an equivalent circuit diagram illustrating a chopper device in a case where a load has been separated in the state illustrated in FIG. 32.

Embodiments of the present invention will be described hereinafter with reference to the drawings. Note that in the drawings referred to in the following embodiments, elements having the same functions as those in FIGS. 31 to 33 will be given the same reference numerals as the ones used in those drawings.

Embodiment 1

Figure 1:
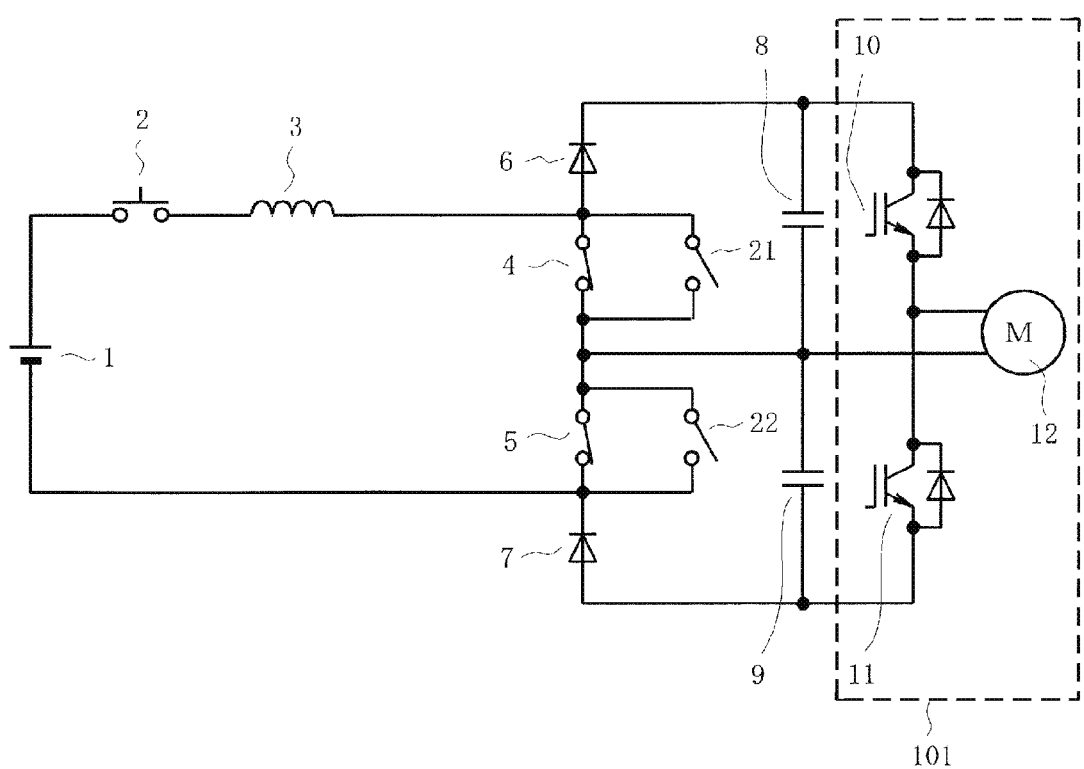
FIG. 1 is a circuit diagram illustrating Embodiment 1 of the present invention.

FIG. 1 is a circuit diagram illustrating Embodiment 1 of the present invention. Although the primary elements of this circuit are the same as those in FIG. 31, these elements will be described again for the sake of clarity.

In FIG. 1, a breaker 2 constituted by a current interrupting device having a mechanical contact, a fuse, or the like, a reactor 3, and switches 4 and 5 such as IGBTs, MOSFETs, or bipolar power transistors, are connected in series between a positive pole and a negative pole of a DC power source 1. A diode 6 and a capacitor 8 are connected in series to respective ends of the switch 4, and a diode 7 and a capacitor 9 are connected in series to respective ends of the switch 5. As such, a point of connection between the switches 4 and 5 is connected to a point of connection between the capacitors 8 and 9.

Meanwhile, both ends of a series circuit formed by the capacitors 8 and 9 and a point of connection (midpoint) between the capacitors 8 and 9 constitute output terminals of a three-level chopper device, and a load 101 is connected between these output terminals. The load 101 includes a series circuit of the switches 10 and 11, which are IGBTs or the like, that constitute a half-bridge inverter, and an AC motor 12.

Note that the load 101 may include a full-bridge single-phase or three-phase inverter, or switches, resistance loads, and so on.

Furthermore, in Embodiment 1, protection switches 21 and 22 are connected in parallel to the switches 4 and 5, respectively. IGBTs, MOSFETs, bipolar power transistors, or the like can be used as these switches 21 and 22.

During normal operations in which chopper operations are realized by the switches 4 and 5 turning on and off, the switches 21 and 22 may be kept off, or the switches 4 and 21 may be turned on and off simultaneously while the switches 5 and 22 are turned on and off simultaneously.

Figure 2:
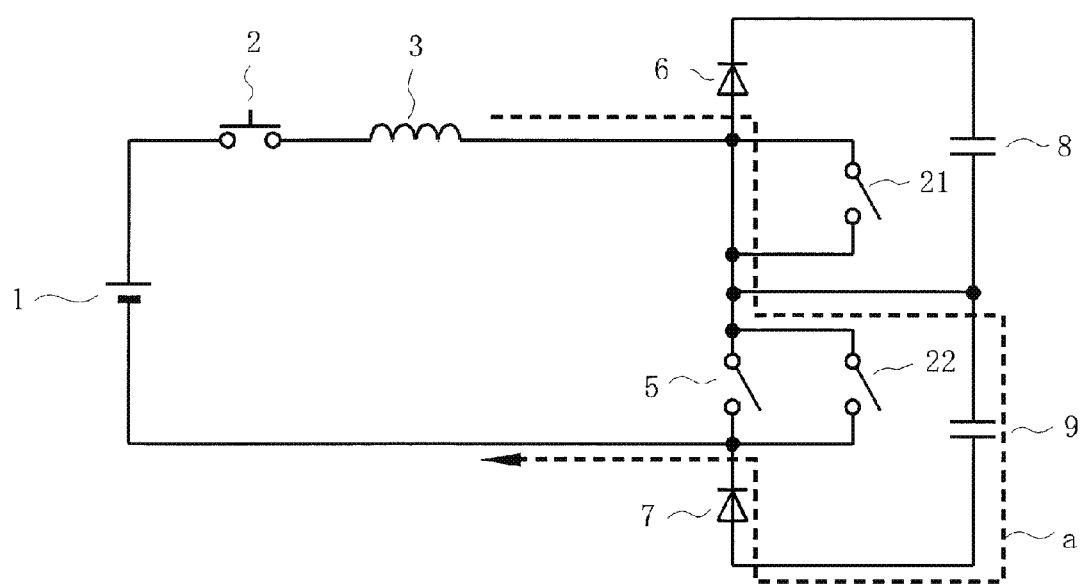
FIG. 2 is an equivalent circuit diagram of the chopper device illustrated in FIG. 1 in a case where one switch that performs chopper operations has short-circuited.

If, for example, the one switch 4 that performs the chopper operations has short-circuited, turning the switches 10 and 11 in the inverter in the subsequent stage off and separating the load 101, and then turning the other switch 5 that performs the chopper operations off, will result in the equivalent circuit illustrated in FIG. 2.

In the circuit illustrated in FIG. 2, series resonance current produced by the reactor 3 and the capacitor 9 flows from the DC power source 1 via the switch 4, which is conductive due to the short-circuit fault, along a path a indicated by the broken line. As described earlier, the series resonance current cannot be controlled by the switch 4 due to the short-circuit fault, and thus unless some sort of measures are taken, a voltage greater than the breakdown voltage of the capacitor 9 will be applied thereto, leading to a risk of the capacitor 9 being damaged by overvoltage, exploding, or the like.

Figure 3:
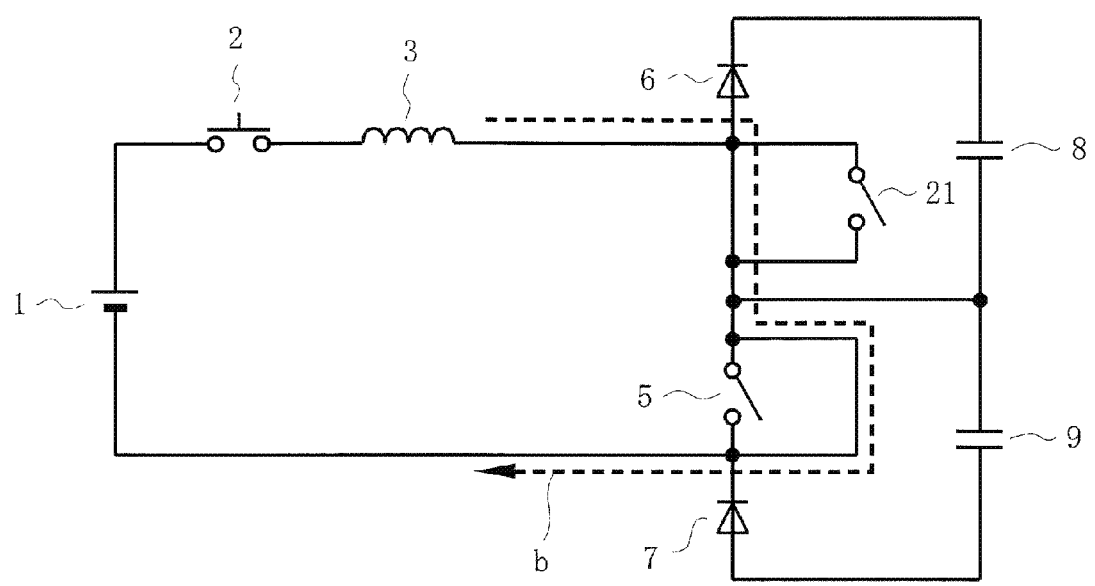
FIG. 3 is an equivalent circuit diagram illustrating a case where one protection switch has turned on in the state illustrated in FIG. 2.

Accordingly, in the present embodiment, the equivalent circuit illustrated in FIG. 3 is formed by turning the protection switch 22 on before opening the breaker 2 in cases where a short-circuit fault is presumed to occur in the switch 4.

According to FIG. 3, current from the DC power source 1 is short-circuited by the switch 22 and flows along a path b. The current therefore does not flow to the capacitor 9, which makes it possible to prevent the capacitor 9 from being damaged by overvoltage.

During this time, the breaker 2 is on, and thus the current flowing from the DC power source 1 to the reactor 3 increases. However, the current in the path b can be interrupted by then operating the breaker 2, which makes it possible to stop the operation of the chopper device.

Here, a high-power semiconductor element may be used as the switch 22 so that the current flowing in the path b in the circuit state illustrated in FIG. 3 can be withstood until the interrupting by the breaker 2 is complete, or a low-power semiconductor element having a low short-circuit tolerance may be used as the switch 22 and the switch 22 may then be allowed to short-circuit. Even if the switch 22 does short-circuit, that energy is vastly lower than when the capacitor 9 is damaged by overvoltage, and thus the danger thereof can be greatly reduced.

Even in the case where the switch 4 and the diode 6 have short-circuited simultaneously, turning the switch 5 off results in a series resonance circuit of the DC power source 1, the reactor 3, and the capacitor 9 being formed. Thus the switch 22 may be turned on to create the path b in the same manner as described above so as to eliminate the current path a passing through the capacitor.

Aside from the above-described examples, in a case of a short-circuit fault in the switch 5 or simultaneous short-circuit faults of the switch 5 and the diode 7, the output-side capacitor can be prevented from being damaged by overvoltage by turning the switch 21 on to eliminate a current path passing through the capacitor 8.

Accordingly, from Embodiment 2 onward, a case in which only the switch 4 has short-circuited will be described as a representative example. Operations for when the switch 4 and the diode 6 have short-circuited simultaneously, for when the switch 5 has short-circuited, and for when the switch 5 and the diode 7 have short-circuited simultaneously can be inferred easily, and thus descriptions thereof will be omitted.

Embodiment 2

Figure 4:
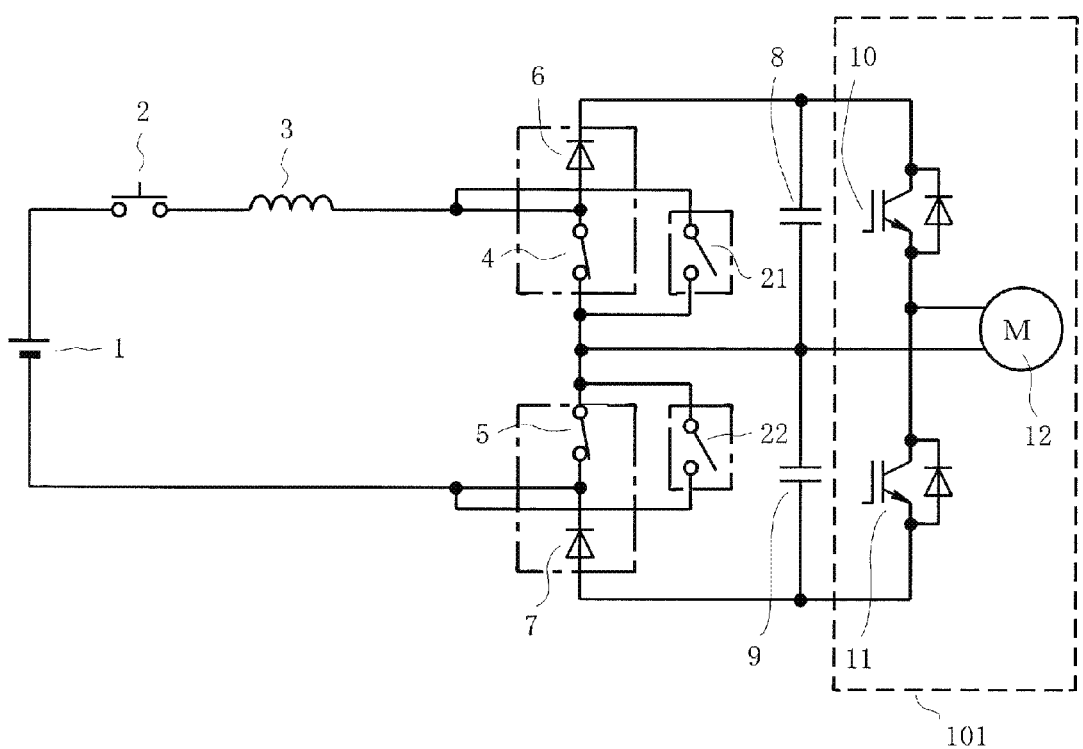
FIG. 4 is a circuit diagram illustrating Embodiment 2 of the present invention.

FIG. 4 is a circuit diagram illustrating Embodiment 2 of the present invention.

The circuit configuration illustrated in FIG. 4 is substantially the same as that illustrated in FIG. 1, but differs from that illustrated in FIG. 1 in that: the switch 4 and the diode 6 are housed in a single package as a chopper module; the switch 5 and the diode 7 are similarly housed in a single package as a chopper module; and furthermore, the switches 21 and 22 are housed in mutually different packages. Note that the long-dash-short-dash lines in FIG. 4 indicate the packages.

In the case where the protection switch 22 is turned on after the switch 4 has short-circuited and the equivalent circuit illustrated in FIG. 3 is then formed as a result of the short-circuit the switches 4 and 22 have been damaged and must therefore be replaced quickly. However, the switch 5 is not damaged and thus does not need to be replaced.

Figure 5:
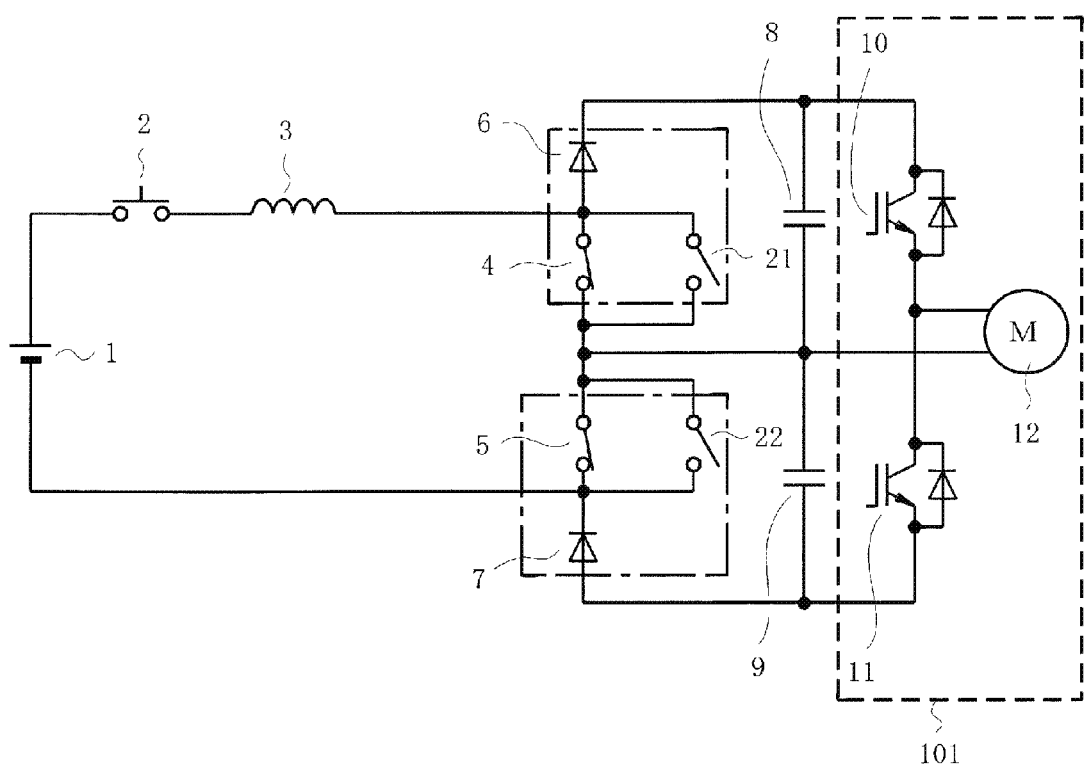
FIG. 5 is a circuit diagram illustrating a comparison example for comparison with Embodiment 2.

Here, assume a case where the switches 4 and 21 and the diode 6 are housed in a single package and the switches 5 and 22 and the diode 7 are housed in a single package, as illustrated in FIG. 5. When a fault has occurred in the switches 4 and 22, it is sufficient to replace only those semiconductor elements. However, if the packages housing the switches 4 and 22 illustrated in FIG. 5 are replaced, the unaffected switches 21 and 5 housed in those packages will also be replaced.

However, if the packaging is carried out as illustrated in FIG. 4, the unaffected switches 21 and 5 will not be needlessly replaced when the switches 4 and 22 are replaced.

Figure 6:
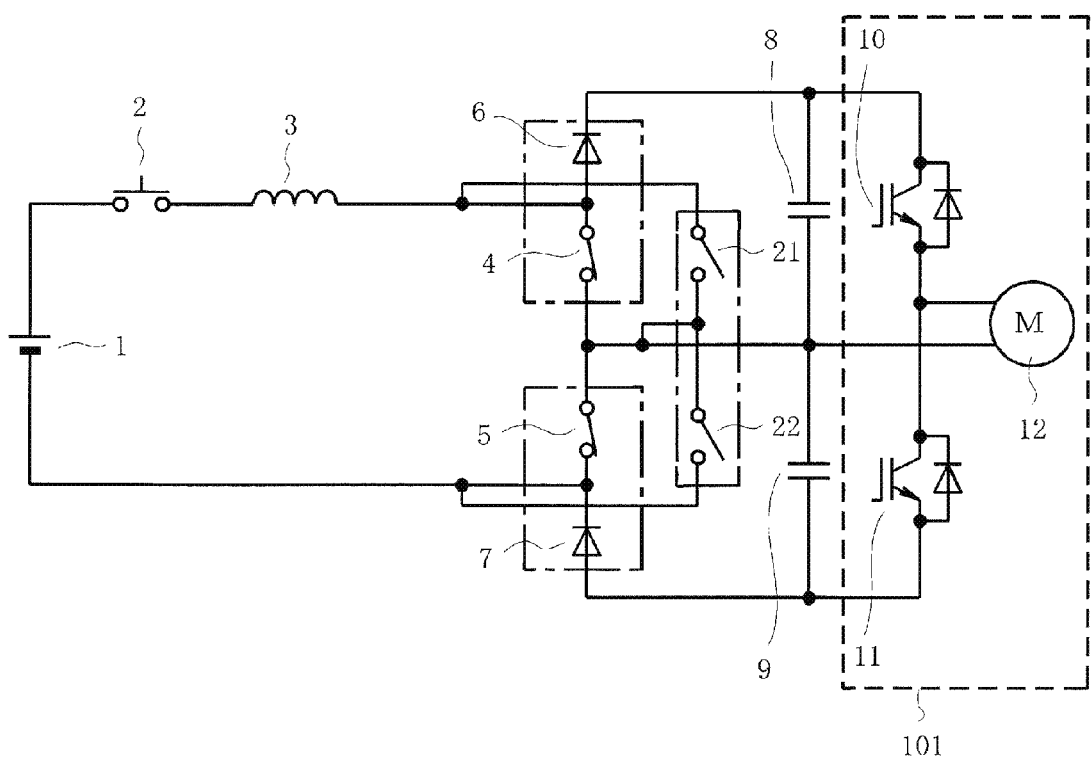
FIG. 6 is a circuit diagram illustrating a variation on Embodiment 2.

Additionally, in the case where the switches 21 and 22 are housed within the same package as illustrated in FIG. 6, the switches 21 and 22 within the package housing the short-circuited switch 22 will be replaced at the same time, but the switch 5 and the diode 7 need not be replaced.

Figure 7:
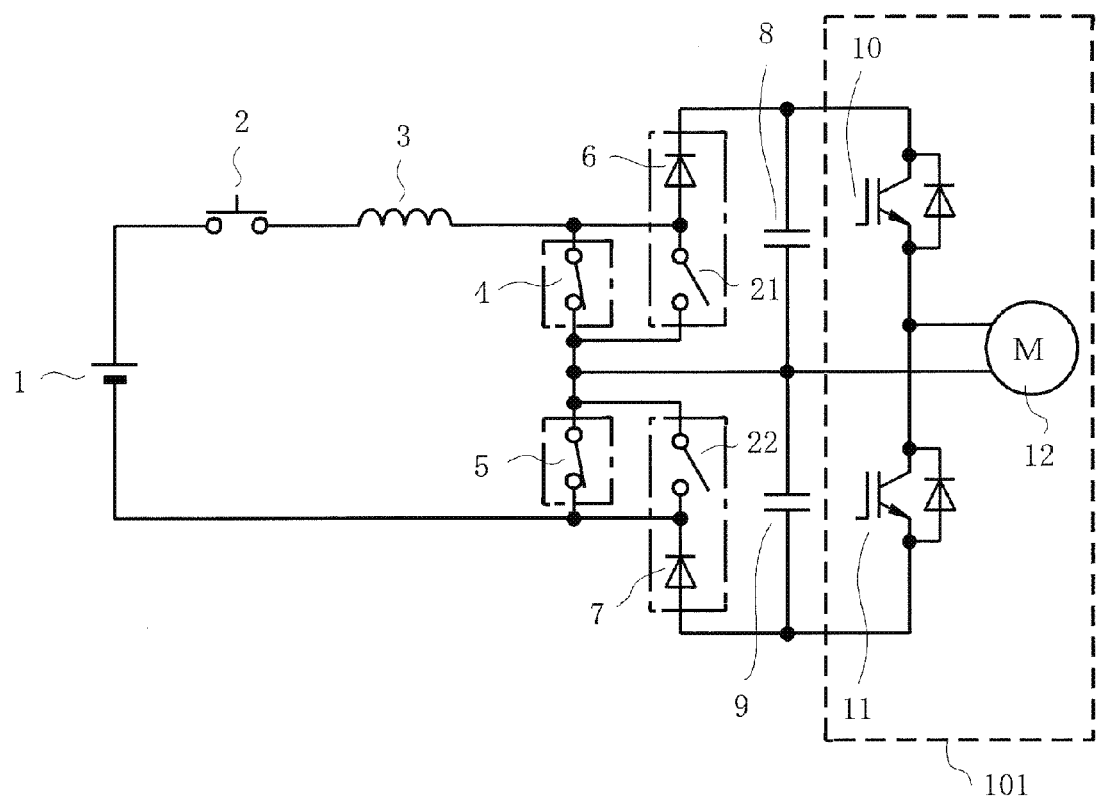
FIG. 7 is a circuit diagram illustrating a variation on Embodiment 2.

Furthermore, in the case where the diode 6 and the switch 21 are housed in the same package, the diode 7 and the switch 22 are housed in the same package, and the switches 4 and 5 are housed in mutually different packages as illustrated in FIG. 7, replacing the switch 22, for example, means that the diode 7 will also be replaced at the same time, but the switch 5 need not be replaced.

Here, the switches 4 and 5 being housed in the same package means that the switch 5 will be replaced when the switch 4 is replaced, and this configuration is therefore not preferable from the standpoint of reducing the number of semiconductor elements to be replaced.

A module housing semiconductor elements for a chopper device (switches and diodes) generally costs more than a protection switch, which is sufficient as long as it has the necessary breakdown voltage. Thus if, as illustrated in FIGS. 6 and 7, the semiconductor elements for the chopper device and the protection switches are housed in mutually different packages so as to avoid a situation in which the semiconductor elements for the chopper device are needlessly replaced, the cost of the device can be reduced.

Figure 8:
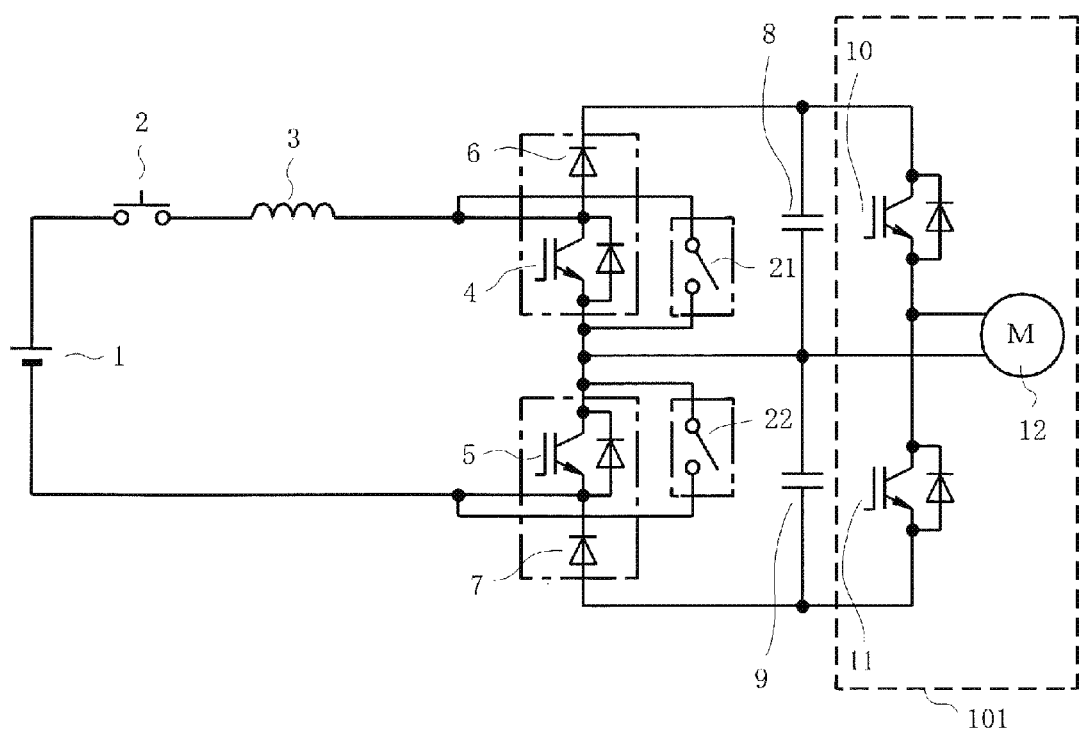
FIG. 8 is a circuit diagram illustrating a variation on Embodiment 2.

Additionally, there are cases where it is necessary to select a package in which the switches 4 and 5 are housed in packages along with a freewheel diode or the like that has no direct relation to the chopper operations, as illustrated in FIG. 8. In the case where such packages are used, but modules housing undamaged switches are not to be replaced, it is preferable that he protection switches 21 and 22 be connected outside the packages of the semiconductor elements that carry out chopper operations, as illustrated in FIGS. 4, 8, and so on.

Thus even in the case where the switch 22, which was turned on when the arm housing the switch 4 short-circuited, has itself short-circuited, it is sufficient to replace the package housing the switch 22, and the package housing the switch 5 need not be replaced. It goes without saying that it is necessary to replace the package housing the switch 4.

Embodiment 3

Embodiment 3 of the present invention will be described next. The circuit configuration according to Embodiment 3 is the same as that illustrated in FIG. 4, and thus the following descriptions will be given with reference to FIG. 4.

As in FIG. 4, in Embodiment 3, the switch 4 and the diode 6 are housed in a single package as a chopper module, the switch 5 and the diode 7 are housed in a single package as a chopper module, and the protection switches 21 and 22 are housed in mutually different packages. A further feature of Embodiment 3 is that diodes constituted by wide band-gap semiconductors, such as silicon carbide Schottky barrier diodes (SiC-SBDs), are used as the diodes 6 and 7, and elements made of a silicon semiconductor are used as the protection switches 21 and 22 connected outside the chopper modules.

The switches 21 and 22 are not conductive during normal operations of the chopper device and it is therefore not necessary to be concerned with loss or the like. Accordingly, it is not necessary to use elements constituted by low-loss and high-cost wide band-gap semiconductors. Rather, it is sufficient to use low-cost elements made of a silicon semiconductor.

Figure 9:
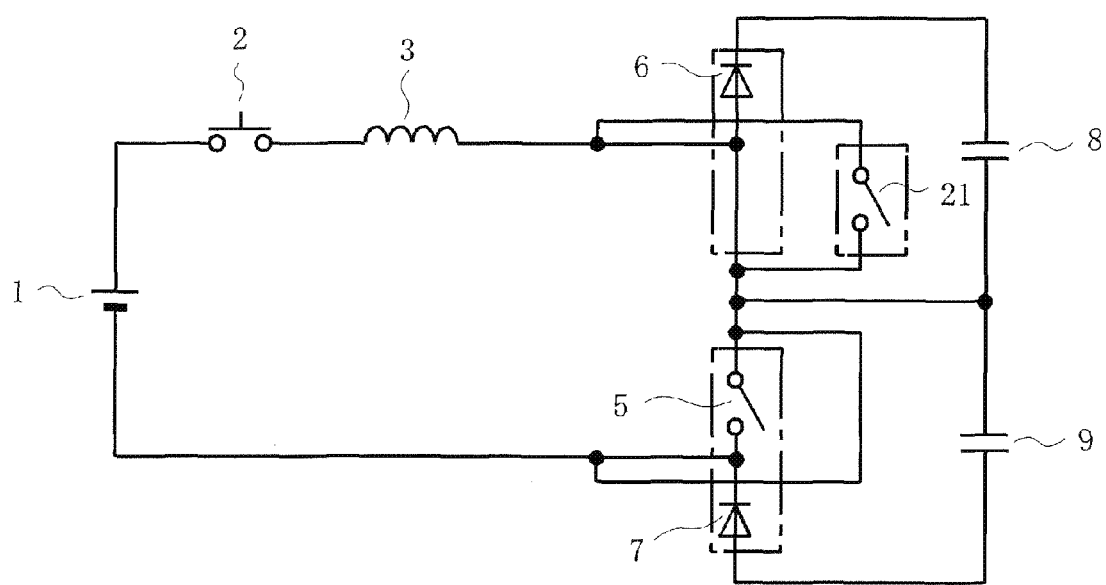
FIG. 9 is an equivalent circuit diagram illustrating a case where one protection switch has turned on according to Embodiment 3 of the present invention.

Even in the case where the switch 22 turns on in response to a short-circuit fault in the switch 4 as illustrated in FIG. 9 and the switch 22 has short-circuited thereafter as a result, the chopper module housing the diode 7 made of a wide band-gap semiconductor is undamaged and thus need not be replaced.

Thus if low-cost elements made of silicon are used as the protection switches 21 and 22 in this manner, a situation in which the chopper module housing the high-cost diode 7 is unnecessarily replaced can be avoided.

Embodiment 4

Figure 10:
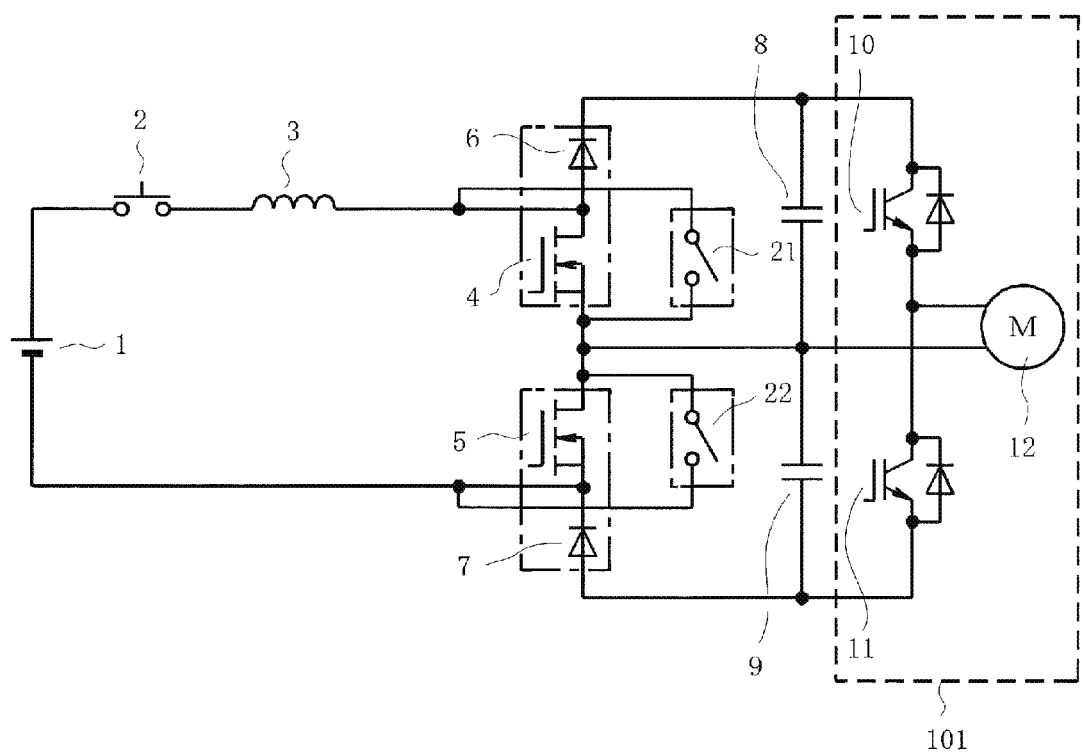
FIG. 10 is a circuit diagram illustrating Embodiment 4 of the present invention.

FIG. 10 is a circuit diagram illustrating Embodiment 4 of the present invention.

Although the circuit configuration according to the present embodiment is substantially the same as that illustrated in FIGS. 4 and 8, a feature of the present embodiment is that elements constituted by wide band-gap semiconductors such as silicon carbide MOS field effect transistors (SiC-MOS-FETs) are used as the switches 4 and 5 that carry out chopper operations, and elements made of silicon are used as the protection switches 21 and 22. As described earlier, the long-dash-short-dash lines in the drawings indicate the packages housing the respective components.

According to Embodiment 4, even in the case where, for example, the switch 22 is turned on in response to a short-circuit fault in the switch 4 and the switch 22 has short-circuited thereafter as a result, the chopper module housing the switch 5 made of a wide band-gap semiconductor has not faulted and thus need not be replaced. Thus compared to the example illustrated in FIG. 5, a situation in which the chopper module is needlessly replaced can be avoided.

Embodiment 5

Figure 11:
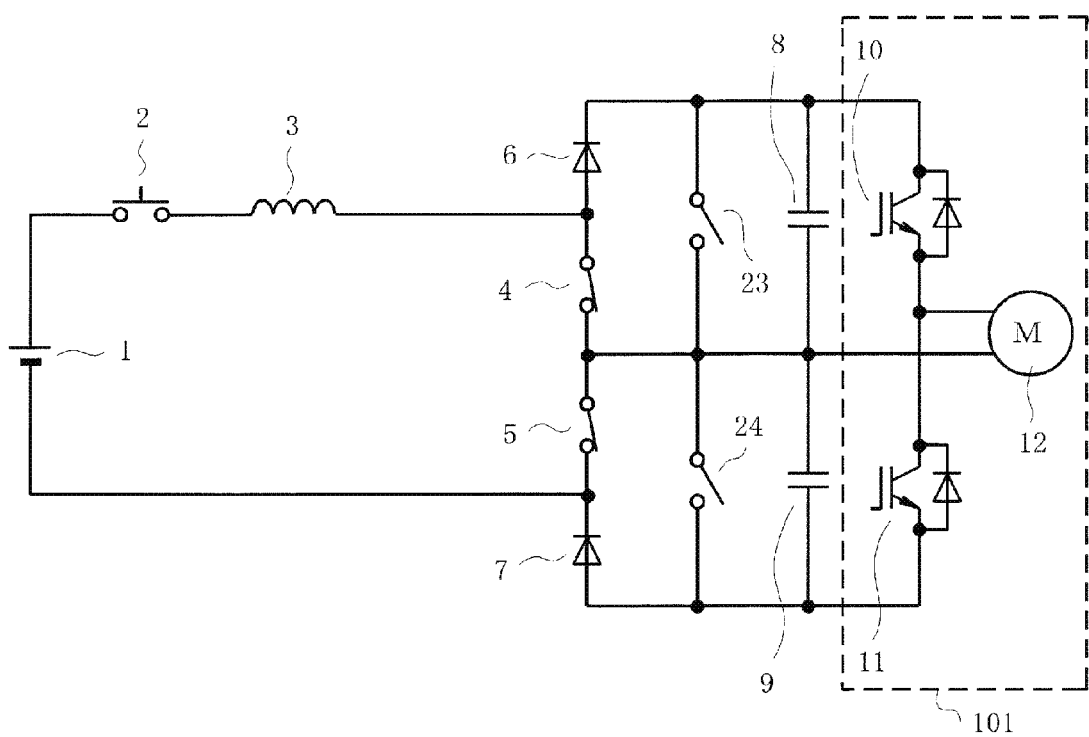
FIG. 11 is a circuit diagram illustrating Embodiment 5 of the present invention.

FIG. 11 is a circuit diagram illustrating Embodiment 5 of the present invention.

In Embodiment 5, protection switches 23 and 24 are connected in parallel to the capacitors 8 and 9, respectively.

Figure 12:
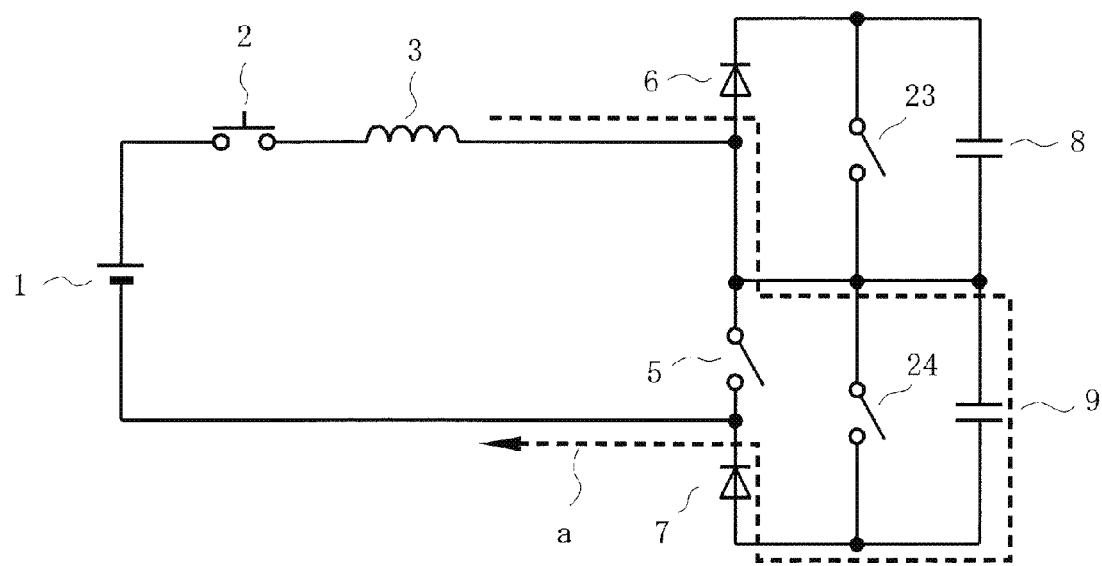
FIG. 12 is an equivalent circuit diagram of the chopper device illustrated in FIG. 11 in a case where one switch that performs chopper operations has short-circuited.

If, when the one switch 4 that performs chopper operations has short-circuited, the load 101 is separated and the other switch 5 turns off, the equivalent circuit illustrated in FIG. 12 is formed. In the circuit illustrated in FIG. 12, series resonance current flows from the DC power source 1 via the switch 4, which is in a short-circuited state, along the path a including the reactor 3 and the capacitor 9. Even in this case, the switch 4 cannot control the series resonance current due to the fault, and there is thus a risk that the capacitor 9 will be damaged by overvoltage.

Figure 13:
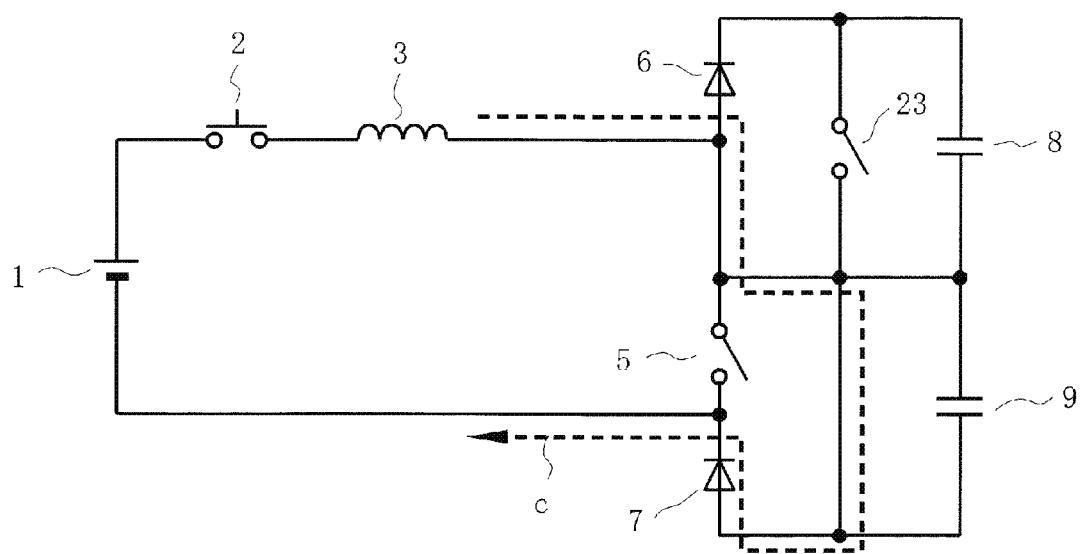
FIG. 13 is an equivalent circuit diagram illustrating a case where one protection switch has turned on in the state illustrated in FIG. 12.

However, if a short-circuit fault is presumed to arise in the switch 4, and the switch 24 is then turned on before the breaker 2 is opened, the circuit illustrated in FIG. 12 will become the equivalent circuit illustrated in FIG. 13. Accordingly, the series resonance current from the DC power source 1 will flow along a path c, and will not flow to the capacitor 9, which makes it possible to prevent the capacitor 9 from being damaged by overvoltage.

In the present embodiment, the switch 23 and the capacitor 8 may be housed in a single package, and the switch 24 and the capacitor 9 may be housed in a single package. Alternatively, these components may be housed in mutually different packages. Furthermore, the switches 23 and 24 may be housed in the same package, or may be housed in mutually different packages.

Embodiment 6

Figure 14:
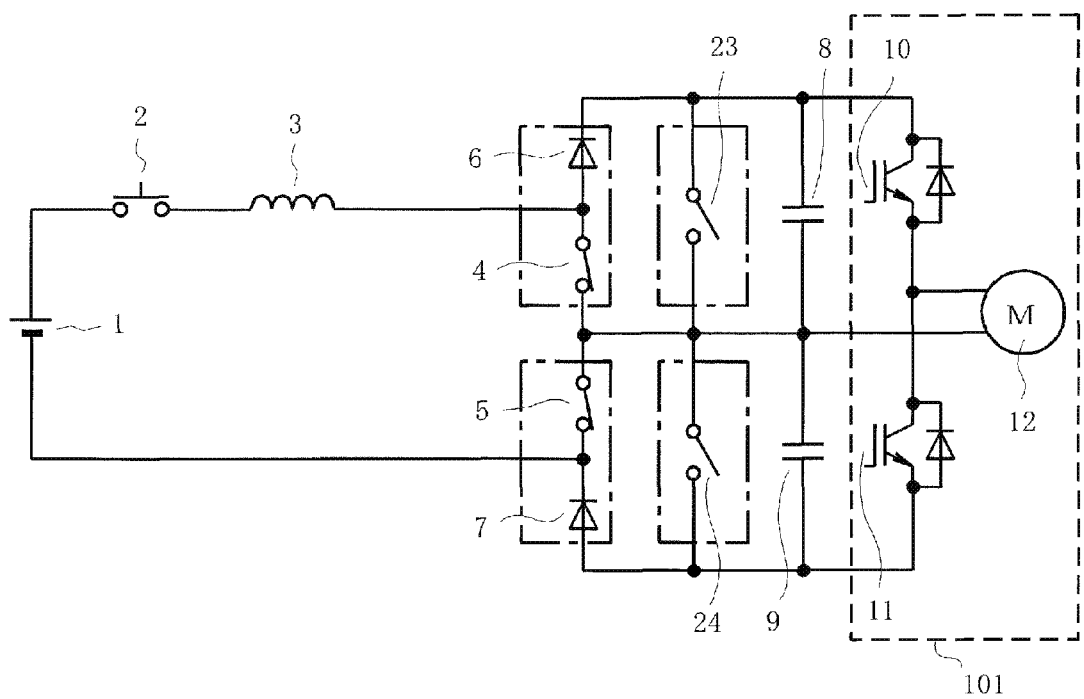
FIG. 14 is a circuit diagram illustrating Embodiment 6 of the present invention.

FIG. 14 is a circuit diagram illustrating Embodiment 6 of the present invention.

According to the present embodiment, a chopper module in which the switch 4 and the diode 6 are housed in the same package, a chopper module in which the switch 5 and the diode 7 are housed in the same package, and packages that individually house the switches 23 and 24 respectively, are used in the configuration illustrated in FIG. 11. Additionally, elements made of wide band-gap semiconductors such as SiC-SBDs are used as the diodes 6 and 7, whereas elements made of silicon semiconductor are used as the protection switches 23 and 24 and are connected outside the chopper modules.

According to Embodiment 6 too, low-cost elements made of silicon semiconductor can be used as the switches 23 and 24 that are not conductive during normal operations of the chopper device.

Additionally, if, when a short-circuit fault is presumed to arise in the switch 4, the switch 24 is turned on before the breaker 2 is opened, current from the DC power source 1 flows along the path c and thus does not flow to the capacitor 9, as illustrated in FIG. 13. Accordingly, the capacitor 9 is prevented from being damaged by overvoltage. Even if the switch 24 does short-circuit, the chopper module housing the diode 7 made of a wide band-gap semiconductor is not damaged. This makes it possible to avoid a situation where the module is needlessly replaced.

Embodiment 7

Figure 15:
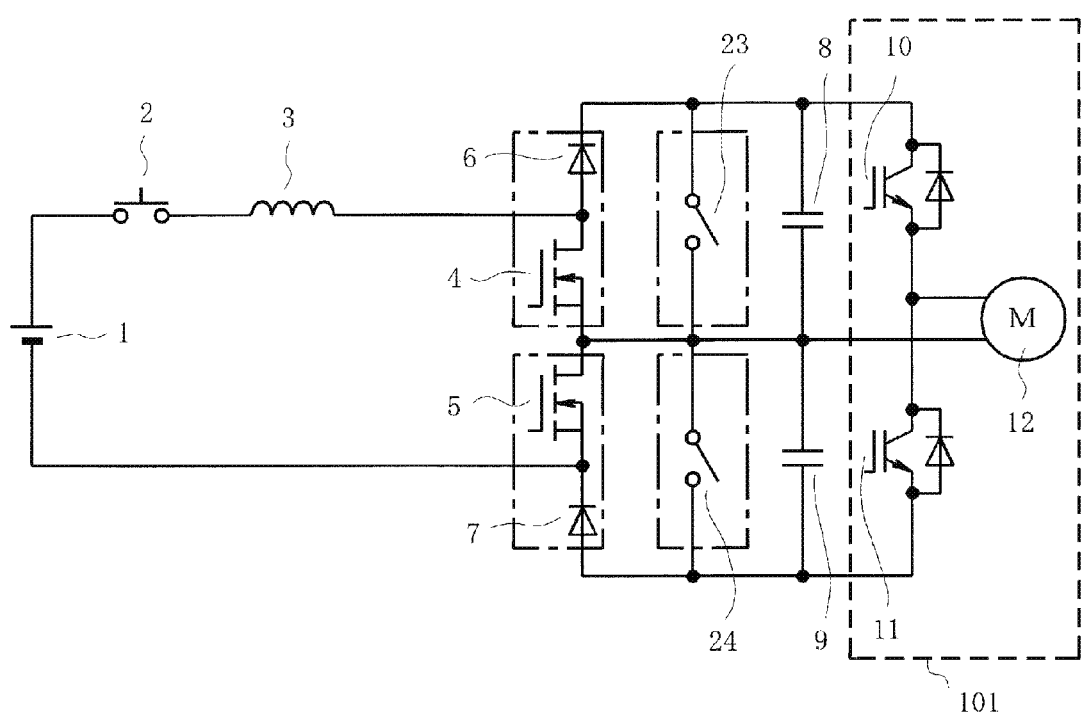
FIG. 15 is a circuit diagram illustrating Embodiment 7 of the present invention.

FIG. 15 is a circuit diagram illustrating Embodiment 7 of the present invention.

According to the present embodiment, elements made of wide band-gap semiconductors such as SiC-MOSFETs are used as the switches 4 and 5 in FIG. 14, whereas elements made of silicon semiconductor are used as the protection switches 23 and 24 and are connected outside the chopper modules.

According to the present embodiment too, the capacitor 9 can be prevented from being damaged by overvoltage when the switch 4 short-circuits, and a situation in which the chopper module housing the switch 5 made of a wide band-gap semiconductor is needlessly replaced can be avoided, in the same manner as in Embodiment 6.

Embodiment 8

Figure 16:
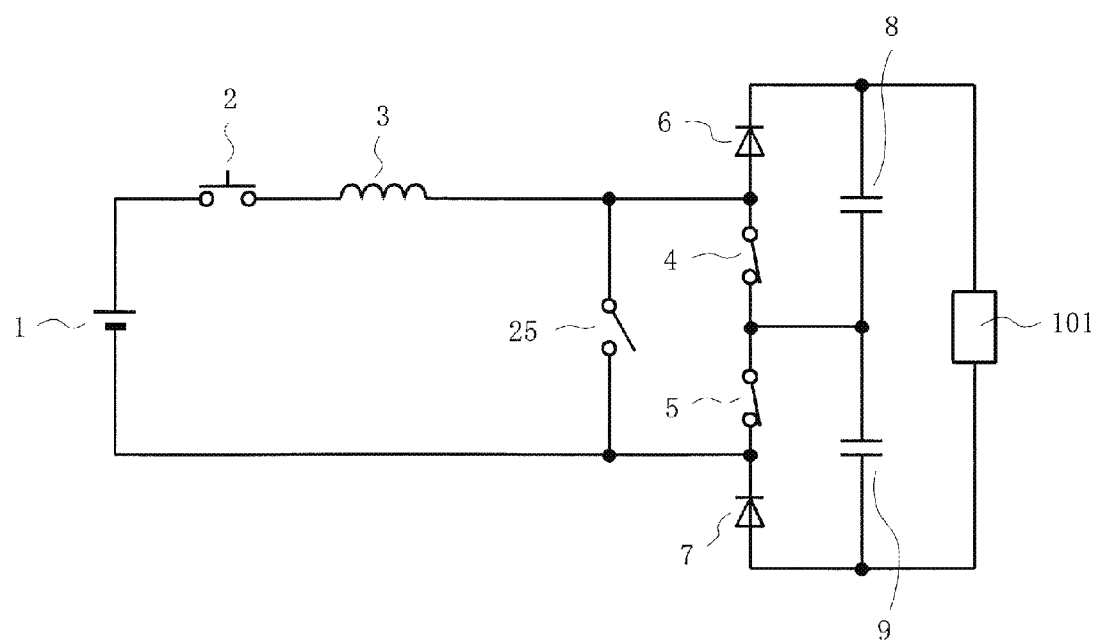
FIG. 16 is a circuit diagram illustrating Embodiment 8 of the present invention.

FIG. 16 is a circuit diagram illustrating Embodiment 8 of the present invention.

In Embodiment 8, a protection switch 25 is connected between an anode of the diode 6 and a cathode of the diode 7, in place of the protection switches 21 and 22 illustrated in FIG. 1.

In the case where there is a period, during operation of the chopper device, where the switches 4 and 5 are turned on simultaneously, the switch 25 may also be turned on at the same time.

Figure 17:
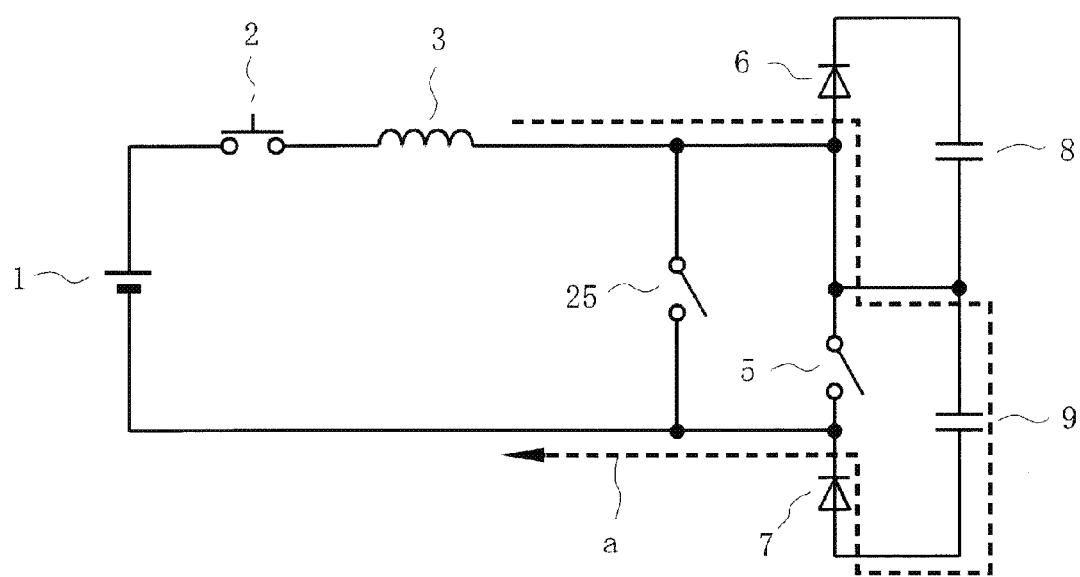
FIG. 17 is an equivalent circuit diagram of the chopper device illustrated in FIG. 16 in a case where one switch that performs chopper operations has short-circuited.

If the load 101 is separated at the time of a short-circuit fault in the switch 4, the equivalent circuit illustrated in FIG. 16 will become that illustrated in FIG. 17. In this case too, uncontrollable series resonance current will flow, via the switch 4 that is conductive, from the DC power source 1 in the path a passing through the capacitor 9, and there is thus a risk that the capacitor 9 will be damaged by overvoltage.

Figure 18:
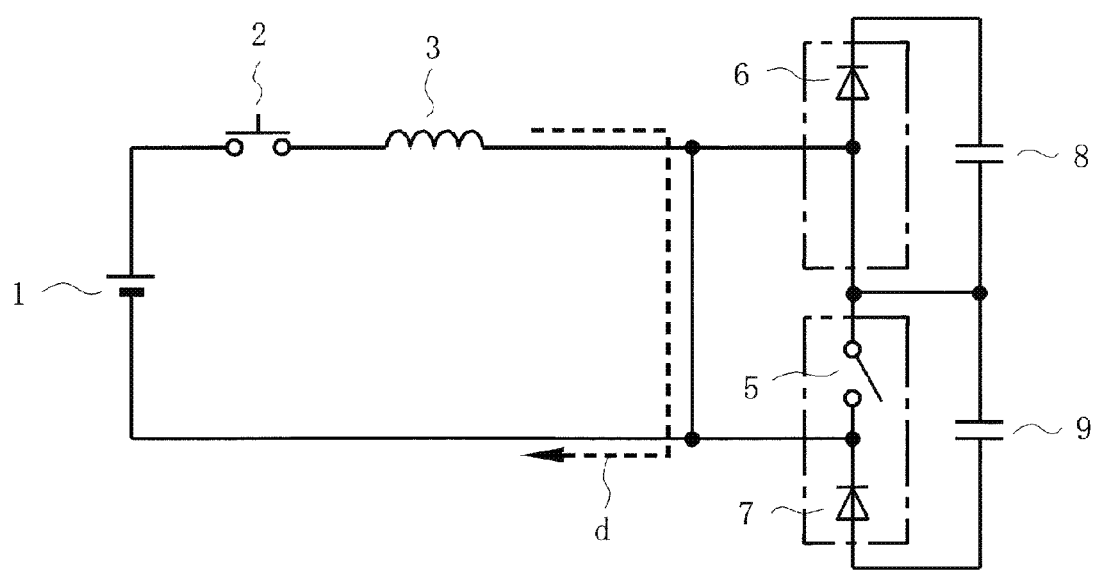
FIG. 18 is an equivalent circuit diagram illustrating a case where a protection switch has turned on in the state illustrated in FIG. 17.

Accordingly, if, in the case where a short-circuit fault is presumed to arise in the switch 4, the protection switch 25 is turned on before the breaker 2 is opened, the current from the DC power source 1 will flow in a path d, as illustrated in FIG. 18, and thus will not flow to the capacitor 9. The capacitor 9 is thus prevented from being damaged by overvoltage.

Embodiment 9

Figure 19:
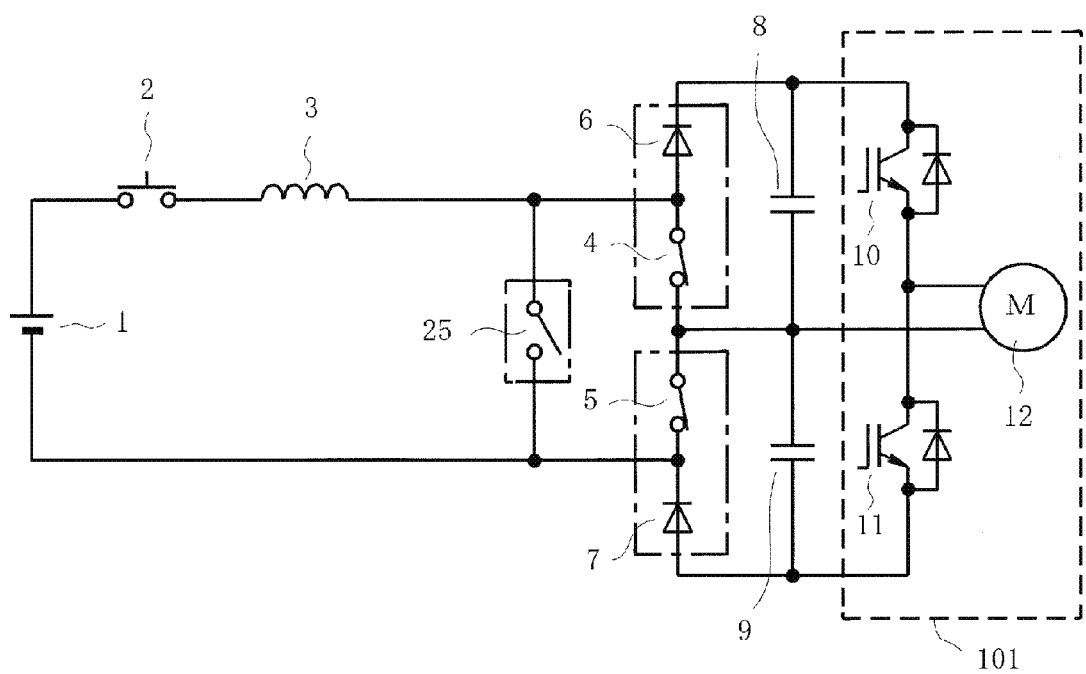
FIG. 19 is a circuit diagram illustrating Embodiment 9 of the present invention.

FIG. 19 is a circuit diagram illustrating Embodiment 9 of the present invention.

According to the present embodiment, a chopper module in which the switch 4 and the diode 6 are housed in the same package, a chopper module in which the switch 5 and the diode 7 are housed in the same package, and a package that houses only the switch 25, are used in the configuration illustrated in FIG. 16.

Additionally, elements made of wide band-gap semiconductors such as SiC-SBDs are used as the diodes 6 and 7, and an element made of silicon semiconductor is used as the switch 25.

According to the present embodiment too, the capacitor 9 can be prevented from being damaged by overvoltage when a short-circuit fault arises in the switch 4, in the same manner as in Embodiment 8.

Additionally, the switch 25 and the switch 5 are housed in different packages. As such, even in the case where the switch 25 turns on in response to a short-circuit fault in the switch 4 and the switch 25 has short-circuited thereafter as a result, a situation in which the chopper module housing the diode 7 made of a high-cost wide band-gap semiconductor is needlessly replaced can be avoided.

Embodiment 10

Figure 20:
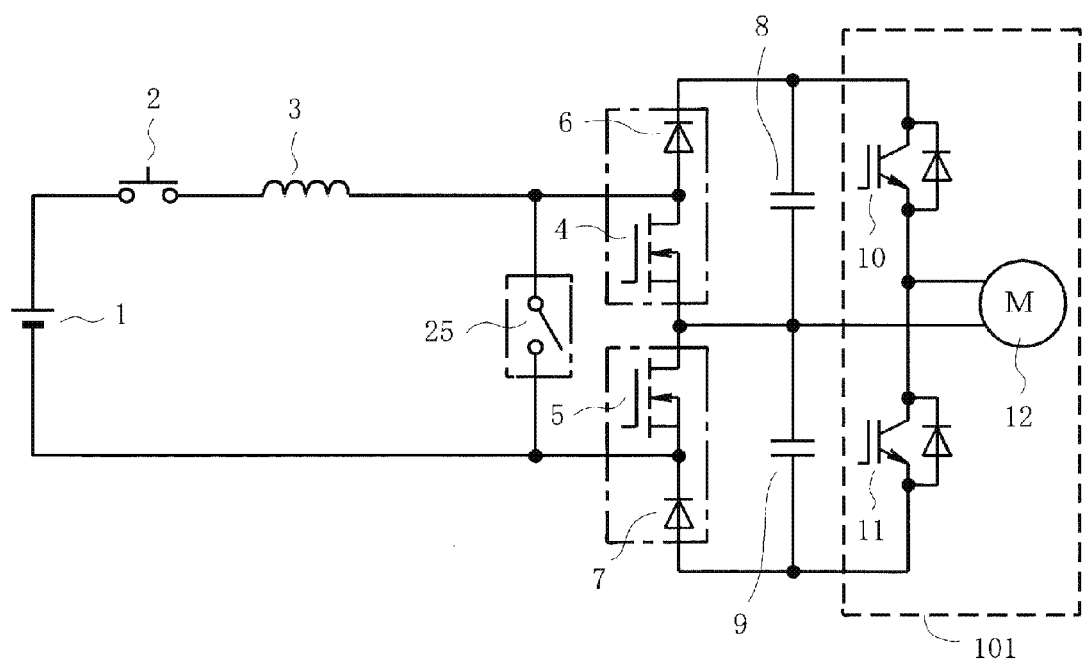
FIG. 20 is a circuit diagram illustrating Embodiment 10 of the present invention.

FIG. 20 is a circuit diagram illustrating Embodiment 10 of the present invention.

According to the present embodiment, elements made of wide band-gap semiconductors such as SiC-MOSFETs are used as the switches 4 and 5 in FIG. 19, whereas an element made of silicon semiconductor is used as the protection switch 25.

According to the present embodiment too, the capacitor 9 can be prevented from being damaged by overvoltage when a short-circuit fault arises in the switch 4, and the switch 25 can also be replaced independently. As such, a situation in which the chopper module housing the switch 5 made of a wide band-gap semiconductor is needlessly replaced can be avoided, in the same manner as in Embodiment 9.

Embodiment 11

Figure 21:
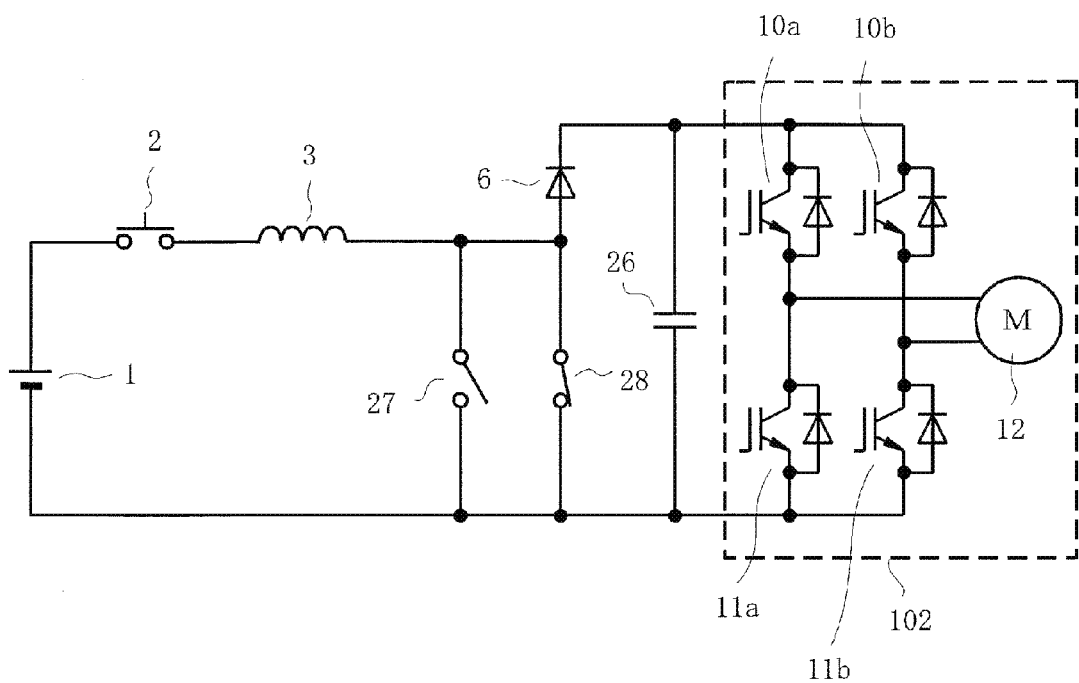
FIG. 21 is a circuit diagram illustrating Embodiment 11 of the present invention.

FIG. 21 is a circuit diagram illustrating Embodiment 11 of the present invention.

In the present embodiment, a protection switch is added to a normal two-level boosting chopper device.

In FIG. 21, 102 indicates a load including a full-bridge inverter constituted by switches 10*a*, 10*b*, 11*a*, and 11*b*, and a motor 12. A series circuit constituted by a diode 6 and a switch 28, and a capacitor 26, are connected in parallel to a DC input side of the stated inverter. Meanwhile, a protection switch 27 is connected in parallel to the switch 28. Other configurations are the same as in the embodiments described above.

The switch 28 is an element for performing chopper operations, and the switch 27 may also be turned at the same time as the switch 28 is turned on.

Figure 22:
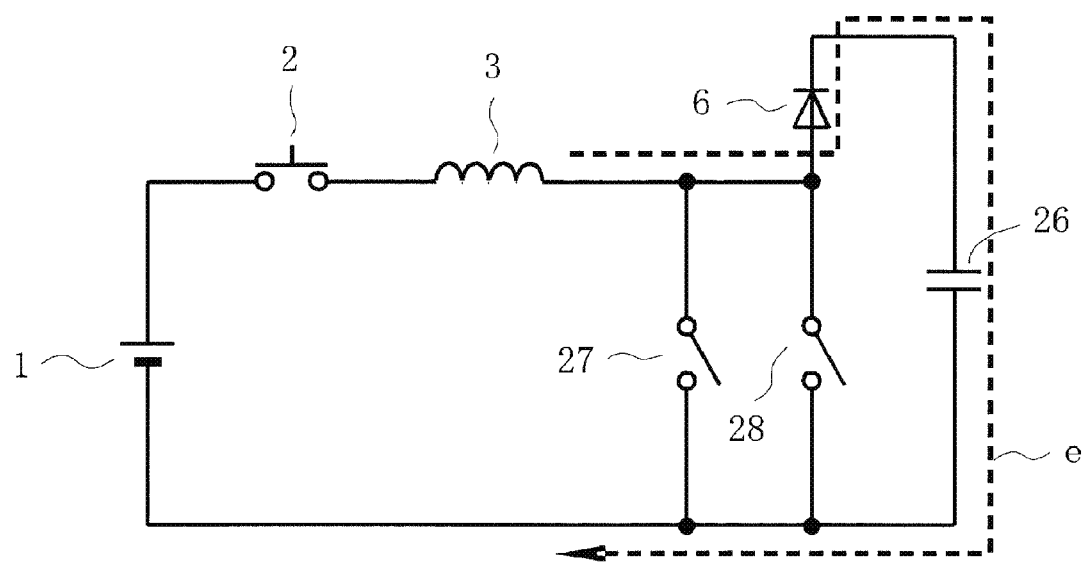
FIG. 22 is an equivalent circuit diagram illustrating a chopper device in a case where a load has been separated in the state illustrated in FIG. 21.

In the present embodiment, in the case where there is an indication that, for example, the switches 10*a*, 10*b*, 11*a*, and 11*b* or the like in the inverter will fault and cause overvoltage in the capacitor 26, the equivalent circuit illustrated in FIG. 22 is formed by separating the load 102 and turning the switch 28 that performs chopper operations off.

In the circuit illustrated in FIG. 22, until the breaker 2 is opened, the reactor 3 and the capacitor 26 are connected in series to the respective ends of the DC power source 1, thus forming a series resonance circuit. As such, current flowing along a path e will cause the voltage of the capacitor 26 to rise beyond the voltage thereof during normal operations.

As described above, with a three-level boosting chopper device such as those described in Embodiments 1 to 10, there are cases where the device is operated with the voltage of the output-side capacitor set lower than the voltage of the DC power source 1. However, if a series resonance circuit is formed by the reactor and the capacitor in such a state, the voltage of the capacitor may increase greatly.

As opposed to this, according to the two-level boosting chopper device illustrated in FIG. 21, the device is normally operated with the voltage of the output-side capacitor 26 set higher than the voltage of the DC power source 1. As such, even if a series resonance circuit such as that illustrated in FIG. 22 is formed, it is difficult to conceive of the voltage of the capacitor 26 greatly rising beyond the voltage thereof during normal operations. However, with a chopper device for use in railways, in the case where a DC power source voltage fluctuates drastically due to bounce or the like the voltage of the DC power source 1 rises suddenly immediately before the switch 28 is turned off, there is a risk that the voltage reaching the capacitor 26 will become extremely high.

Figure 23:
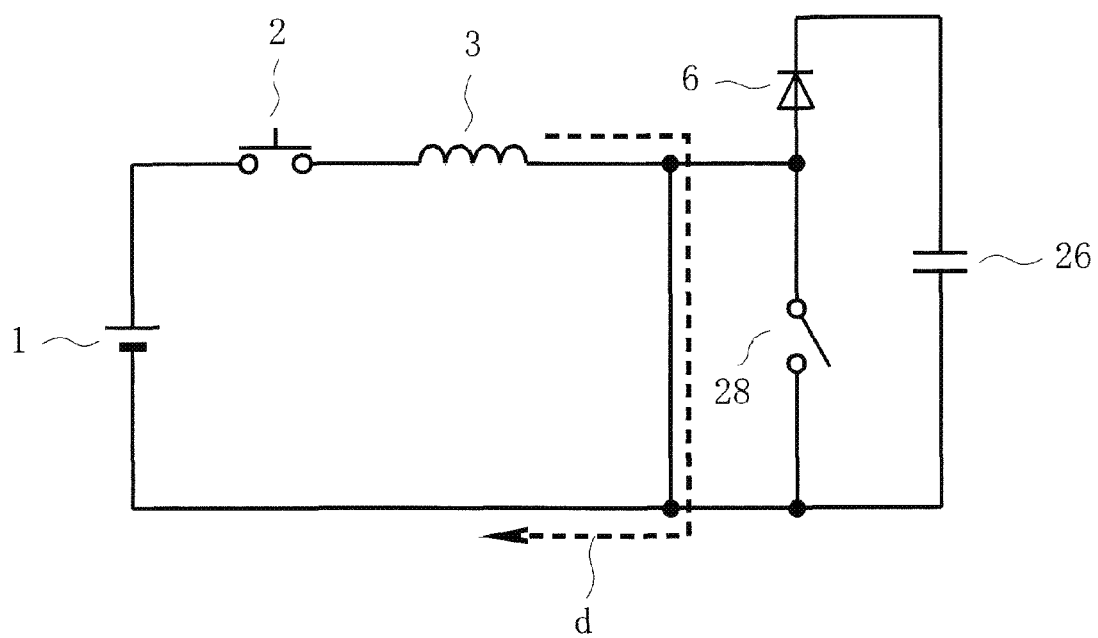
FIG. 23 is an equivalent circuit diagram illustrating a case where a protection switch has turned on in the state illustrated in FIG. 22.

Even at such a time, in the case where an indication that the capacitor 26 will enter a state of overvoltage is detected, turning the protection switch 27 on before the breaker 2 is opened results in the equivalent circuit illustrated in FIG. 23 being formed. As a result, current from the DC power source 1 flows along the path d, and the path e indicated in FIG. 22 is eliminated. This makes it possible to prevent the capacitor 26 from being damaged by overvoltage, the switch 28 breaking down or being damaged by overvoltage, and so on. After the switch 27 has been turned on, the chopper device operations are stopped by operating the breaker 2 to interrupt the current from the DC power source 1.

Although the switches 27 and 28 may be housed in the same package, it is desirable that these switches be housed in mutually different packages.

The protection switch 27 need not be conductive during normal operations of the chopper, and thus it is not necessary to use a high-performance, high-cost semiconductor element. For example, a low-cost element made of silicon semiconductor can be used. Accordingly, in the case where high-cost elements such as wide band-gap semiconductors are used as the switch 28, the diode 6, and so on, replacing only the low-cost switch 27 improves the cost performance.

Embodiment 12

Figure 24:
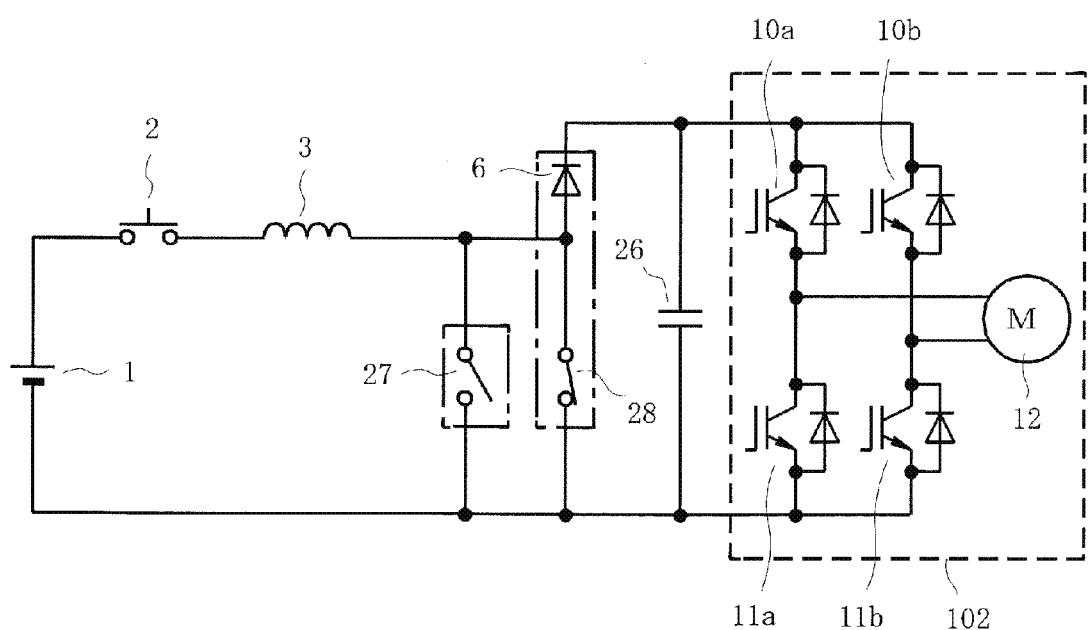
FIG. 24 is a circuit diagram illustrating Embodiment 12 of the present invention.

FIG. 24 is a circuit diagram illustrating Embodiment 12 of the present invention.

According to the present embodiment, a SiC-SBD made of a wide band-gap semiconductor is used as the diode 6 in the chopper module. Additionally, the diode 6 and the switch 28 are housed in the same package, and the protection switch 27 is housed in a different package. A low-cost element made of silicon semiconductor is used as the switch 27.

Having the switches 27 and 28 housed in mutually different packages as in the present embodiment means that even if the protection switch 27 has short-circuited after being turned on, it is possible to change only the switch 27.

If the voltage of the capacitor 26 rises and the switch 28 is damaged by overvoltage, the diode 6 housed in the same package as the switch 28, or in other words, the diode 6 made of a high-cost wide band-gap semiconductor, also needs to be replaced.

According to the present embodiment, only the switch 27 is housed in a different package, and thus turning the switch 27 on before the switch 28 is damaged by overvoltage makes it possible to protect the capacitor 26, the switch 28, the diode 6, and so on. Additionally, even in the case where the switch 27 has short-circuited thereafter, it is only necessary to replace the low-cost switch 27.

Embodiment 13

Figure 25:
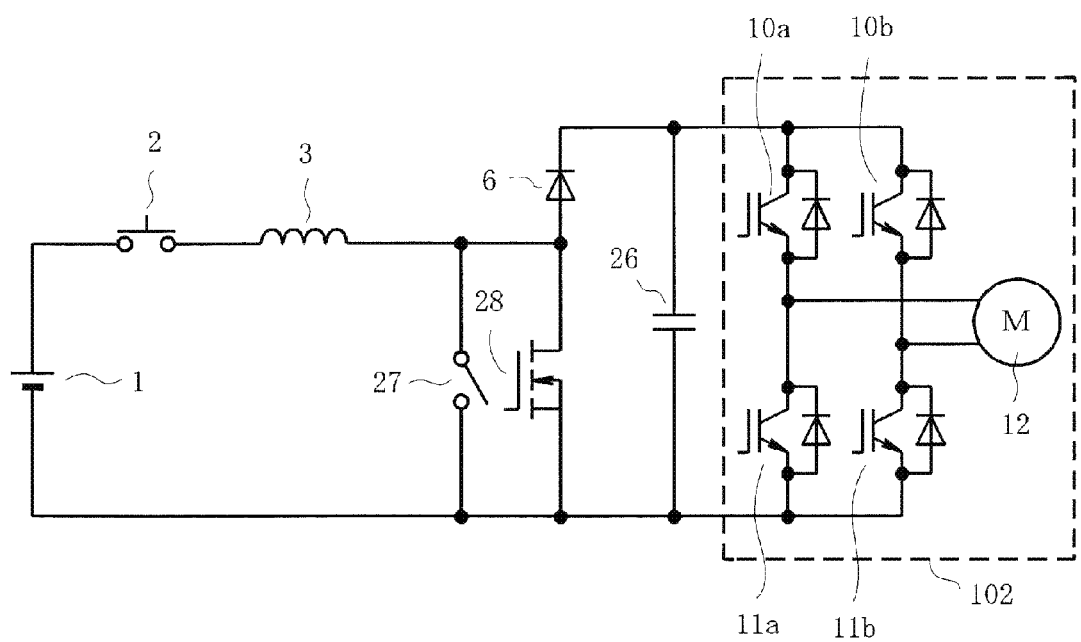
FIG. 25 is a circuit diagram illustrating Embodiment 13 of the present invention.

FIG. 25 is a circuit diagram illustrating Embodiment 13 of the present invention.

According to the present embodiment, a SiC-MOSFET or the like made of a wide band-gap semiconductor is used as the switch 28 described in Embodiment 11. An element made of silicon semiconductor is used as the protection switch 27.

Operations according to the present embodiment are basically the same as in the above-described Embodiment 11 and Embodiment 12, and thus details thereof will be omitted. However, if the switch 27 is turned on before the switch 28 is damaged by overvoltage due to the voltage of the capacitor 26, the capacitor 26, the high-cost switch 28, and so on can be protected.

Additionally, housing the switches 27 and 28 in mutually different packages means that even if the switch 27 has then short-circuited, it is possible to replace only the low-cost switch 27, which provides high cost performance.

Embodiment 14

Figure 26:
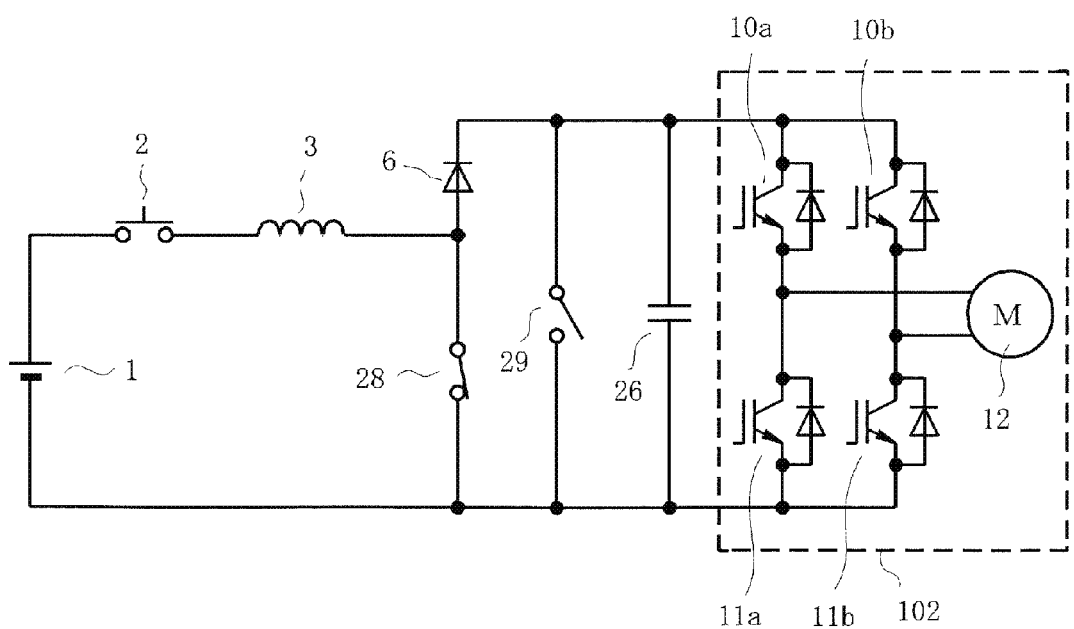
FIG. 26 is a circuit diagram illustrating Embodiment 14 of the present invention.

FIG. 26 is a circuit diagram illustrating Embodiment 14 of the present invention.

According to the present embodiment, a protection switch 29 is connected in parallel to the capacitor 26 as illustrated in FIG. 26, in place of the protection switch 27 described in Embodiment 11 with reference to FIG. 21.

Figure 27:
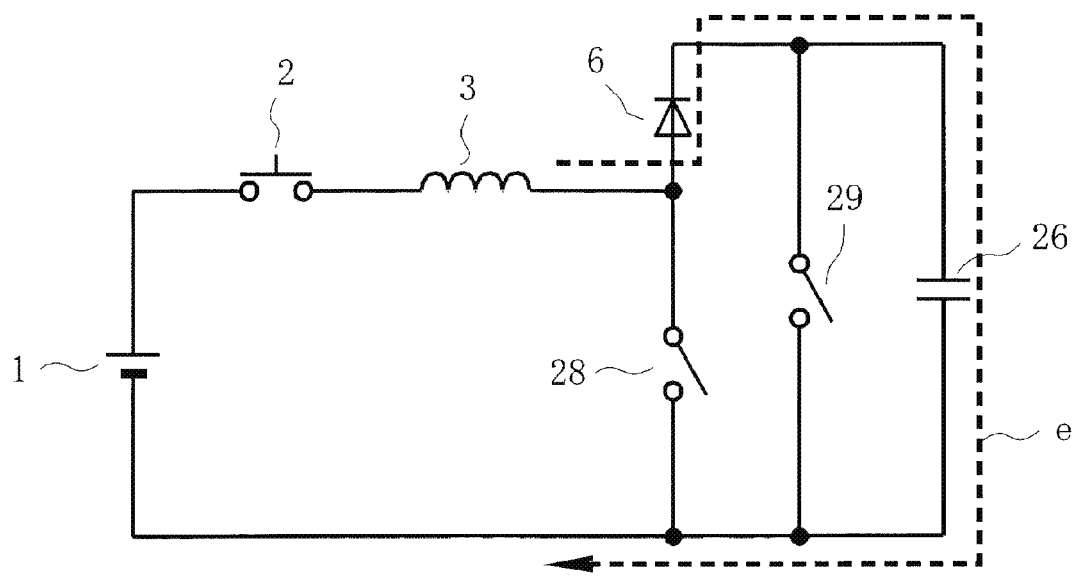
FIG. 27 is an equivalent circuit diagram illustrating a chopper device in a case where a load has been separated in the state illustrated in FIG. 26.

In the case where the inverter or the like of the load 102 has faulted, separating the load 102 and turning the switch 28 that performs chopper operations off will result in the equivalent circuit illustrated in FIG. 27 being formed. In the case where an indication that the capacitor 26 will enter a state of overvoltage is detected, if the protection switch 29 is turned on before the breaker 2 is opened, current in the path e indicated in FIG. 27 flows in a path f indicated in FIG. 28, and no longer flows to the capacitor 26. As a result, the capacitor 26 can be prevented from being damaged by overvoltage, and the switch 28 can be prevented from breaking down or being damaged by overvoltage.

After this, the chopper device operations are stopped by operating the breaker 2 to interrupt the current from the DC power source 1.

Although the switches 28 and 29 may be housed in the same package, housing these switches in mutually different packages means that in the case where, for example, the switch 29 has short-circuited and thus needs to be replaced, it is only necessary to replace the switch 29.

Accordingly, even in the case where a low-cost element made of silicon semiconductor is used as the switch 29, which need not be conductive during normal operations of the chopper device, and high-performance and high-cost semiconductor elements are used as the switch 28, the diode 6, and so on that perform chopper operations, it is not necessary to replace the switch 28, which is economical.

Embodiment 15

Figure 29:
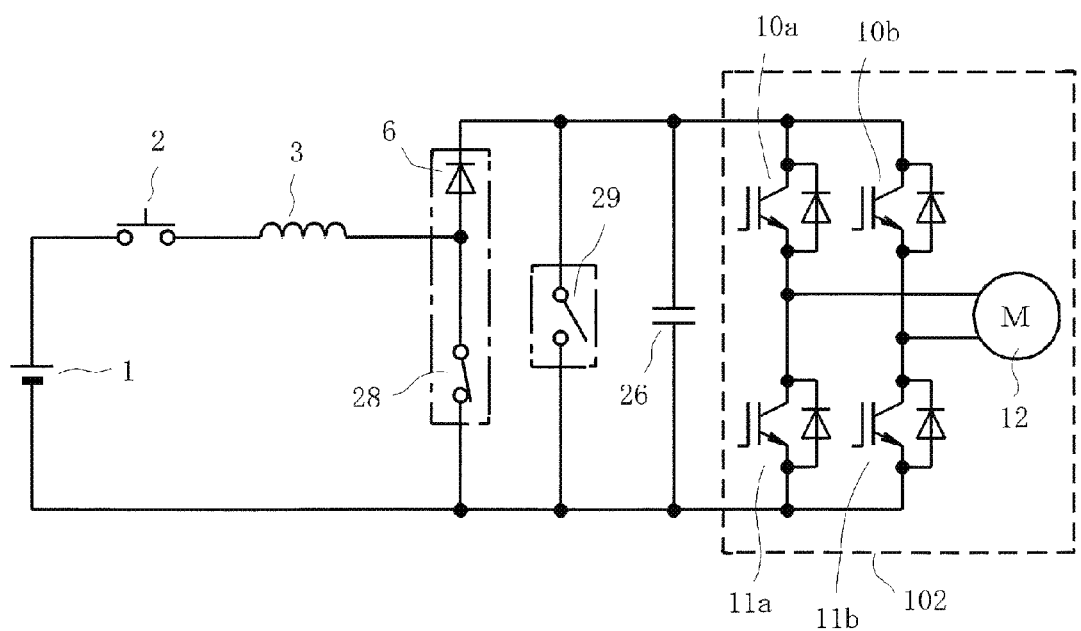
FIG. 29 is a circuit diagram illustrating Embodiment 15 of the present invention.

FIG. 29 is a circuit diagram illustrating Embodiment 15 of the present invention.

According to the present embodiment, an element made of a wide band-gap semiconductor such as a SiC-SBD is used as the diode 6 illustrated in FIG. 26. Additionally, a chopper module constituted by the diode 6 and the switch 28 is housed in the same package, whereas the switch 29 is housed in a different package.

Figure 28:
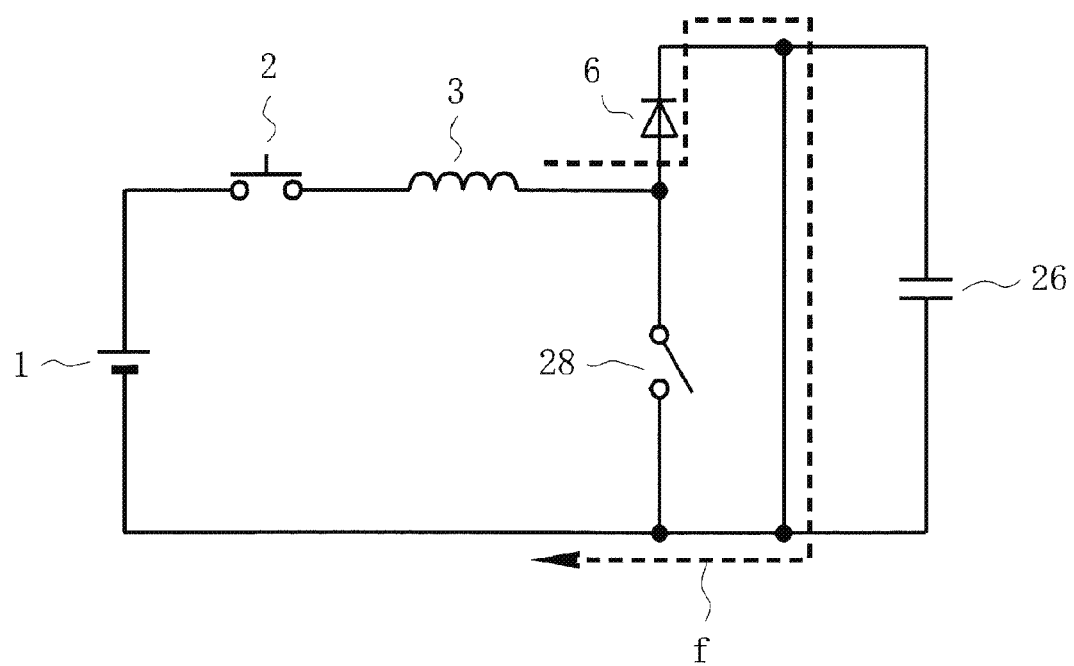
FIG. 28 is an equivalent circuit diagram illustrating a case where a protection switch has turned on in the state illustrated in FIG. 27.

In the present embodiment too, when a fault has occurred in the inverter, for example, the capacitor 26 can be prevented from being damaged by overvoltage by turning the switch 29 on and causing current to flow in the path f indicated in FIG. 28. Meanwhile, in the case where the switch 29 short-circuits thereafter and therefore must be replaced, it is possible to replace only the switch 29. As such, the chopper module including the high-cost diode 6 can continue to be used.

Embodiment 16

Figure 30:
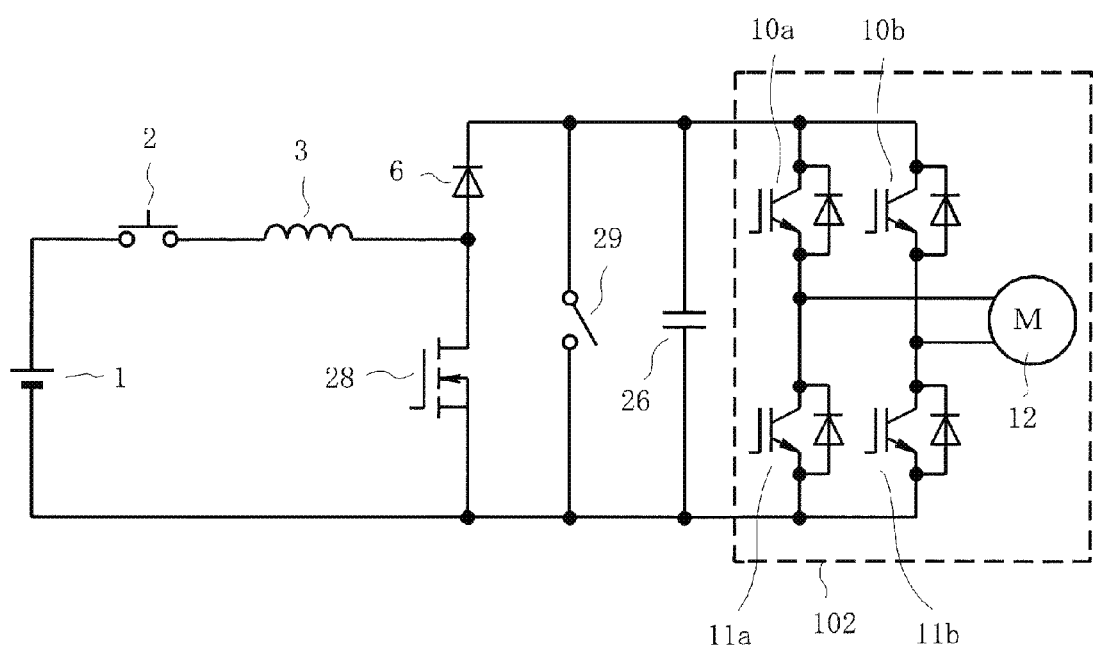
FIG. 30 is a circuit diagram illustrating Embodiment 16 of the present invention.

FIG. 30 is a circuit diagram illustrating Embodiment 16 of the present invention.

According to the present embodiment, an element made of a wide band-gap semiconductor such as a SiC-MOSFET is used as the chopper switch 28 illustrated in FIG. 26, and a low-cost element made of silicon semiconductor is used as the protection switch 29.

With the present embodiment too, the capacitor 26 can be prevented from being damaged by overvoltage according to the same principles as those described in Embodiment 14 and Embodiment 15. Additionally, in the case where the switch 29 that has been turned on then short-circuits and must be replaced, it is sufficient to replace only the switch 29, and the chopper module including the high-cost switch 28 can continue to be used.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A chopper device, comprising:
 a DC power source;
 a series circuit having a breaker and a reactor connected in series, one end of the series circuit being connected to one pole of said DC power source;
 a switch series circuit having a first switch and a second switch connected in series, said switch series circuit being connected between another end of said series circuit and another pole of said DC power source;
 a first series circuit having a first diode and a first capacitor connected in series, said first series circuit being connected in parallel to said first switch; and
 a second series circuit having a second diode and a second capacitor connected in series, said second series circuit being connected in parallel to said second switch,
 wherein said first capacitor and said second capacitor are connected in series, defining a capacitor series circuit,
 wherein said first switch and said second switch are turned ON and OFF to output DC voltages at three potentials from both ends and a midpoint of said capacitor series circuit having said first capacitor and said second capacitor, thereby supplying the DC voltages to a load,
 wherein the chopper device further includes a third switch connected in parallel to said first switch and a fourth switch connected in parallel to said second switch, and
 wherein when a short-circuit fault is detected to have occurred in said first switch, said fourth switch is turned ON before interruption is performed by said breaker, and when a short-circuit fault is detected to have occurred in said second switch, said third switch is turned ON before interruption is performed by said breaker.

2. The chopper device according to claim 1, wherein said third switch and said fourth switch are housed in a different package from said first switch or said second switch.

3. The chopper device according to claim 1, wherein said first diode and said first switch are housed in the same package, and said second diode and said second switch are housed together in a different package.

4. The chopper device according to claim 1, wherein said third switch and said fourth switch are housed in the same package.

5. The chopper device according to claim 1, wherein said third switch and said fourth switch are housed in mutually different packages.

6. The chopper device according to claim 1, wherein said first diode and said third switch are housed in the same package, and said second diode and said fourth switch are housed together in a different package.

7. The chopper device according to claim 1,
wherein elements constituted by wide band-gap semiconductors are used as said first switch and said second switch, and an element constituted by a silicon semiconductor is used as said third switch or said fourth switch.

8. The chopper device according to claim 1,
wherein an element constituted by a wide band-gap semiconductor is used as said diode.

9. A chopper device, comprising:
a DC power source;
a series circuit having a breaker and a reactor connected in series, one end of the series circuit being connected to one pole of said DC power source;
a switch series circuit having a first switch and a second switch connected in series, said switch series circuit being connected between another end of said series circuit and another pole of said DC power source;
a first series circuit having a first diode and a first capacitor connected in series, said first series circuit being connected in parallel to said first switch; and
a second series circuit having a second diode and a second capacitor connected in series, said second series circuit being connected in parallel to said second switch,
wherein said first capacitor and said second capacitor are connected in series, defining a capacitor series circuit,
wherein said first switch and said second switch are turned ON and OFF to output DC voltages at three potentials from both ends and a midpoint of said capacitor series circuit having said first capacitor and said second capacitor, thereby supplying the DC voltages to a load,
wherein the chopper device further includes a third switch connected in parallel to said first capacitor and a fourth switch connected in parallel to said second capacitor, and
wherein when a short-circuit fault is detected to have occurred in said first switch, said fourth switch is turned ON before interruption is performed by said breaker, and when a short-circuit fault is detected to have occurred in said second switch, said third switch is turned ON before interruption is performed by said breaker.

10. The chopper device according to claim 9,
wherein said third switch and said fourth switch are housed in a different package from said first switch or said second switch.

11. The chopper device according to claim 9,
wherein said third switch and said fourth switch are housed in the same package.

12. The chopper device according to claim 9,
wherein said third switch and said fourth switch are housed in mutually different packages.

13. The chopper device according to claim 9,
wherein said first diode and said third switch are housed in the same package, and said second diode and said fourth switch are housed together in a different package.

14. A chopper device, comprising:
a DC power source;
a series circuit having a breaker and a reactor connected in series, one end of the series circuit being connected to one pole of said DC power source;
a switch series circuit having a first switch and a second switch connected in series, said switch series circuit being connected between another end of said series circuit and another pole of said DC power source;
a first series circuit having a first diode and a first capacitor connected in series, said first series circuit being connected in parallel to said first switch; and
a second series circuit having a second diode and a second capacitor connected in series, said second series circuit being connected in parallel to said second switch,
wherein said first capacitor and said second capacitor are connected in series, defining a capacitor series circuit,
wherein said first switch and said second switch are turned ON and OFF to output DC voltages at three potentials from both ends and a midpoint of said capacitor series circuit having said first capacitor and said second capacitor, thereby supplying the DC voltages to a load,
wherein the chopper device further includes a third switch connected in parallel to said switch series circuit,
wherein when a short-circuit fault is detected to have occurred in said first switch or said second switch, said third switch is turned ON before interruption is performed by said breaker.

15. The chopper device according to claim 14,
wherein said third switch is housed in a different package from said first switch or said second switch.

16. A chopper device, comprising:
a DC power source;
a first series circuit having a breaker and a reactor connected in series, one end of said first series circuit being connected to one pole of said DC power source;
a first switch connected between another end of said first series circuit and another pole of said DC power source; and
a second series circuit having a diode and a capacitor connected in series, said second series circuit being connected in parallel to said first switch, said first switch being turned ON and OFF to output a DC voltage at a prescribed magnitude from both ends of said capacitor,
wherein the chopper device further includes a second switch connected in parallel to said first switch, and
wherein when a state of overvoltage is detected to have occurred in said capacitor, said second switch is turned ON before interruption is performed by said breaker.

17. The chopper device according to claim 16,
wherein said diode and said first switch are housed in the same package.

18. The chopper device according to claim 16,
wherein said diode and said first switch are housed in the same package.

19. The chopper device according to claim 16,
wherein an element constituted by a wide band-gap semiconductor is used as said first switch, and an element constituted by a silicon semiconductor is used as said second switch.

20. A chopper device, comprising:
a DC power source;
a first series circuit having a breaker and a reactor connected in series, one end of said first series circuit being connected to one pole of said DC power source;
a first switch connected between another end of said first series circuit and another pole of said DC power source; and
a second series circuit having a diode and a capacitor connected in series, said second series circuit being connected in parallel to said first switch, said first switch being turned ON and OFF to output a DC voltage at a prescribed magnitude from both ends of said capacitor, wherein the chopper device further includes a second switch connected in parallel to said capacitor, and
wherein when a state of overvoltage is detected to have occurred in said capacitor, said second switch is turned ON before interruption is performed by said breaker.

* * * * *